US012198491B2

(12) United States Patent
Rabinovich et al.

(10) Patent No.: US 12,198,491 B2
(45) Date of Patent: Jan. 14, 2025

(54) DEVICE, AN APPARATUS AND A METHOD FOR DIRECTING BANK NOTES

(71) Applicants: SUZOHAPP Canada ULC, Woodbridge (CA); Scan Coin AB, Malmo (SE)

(72) Inventors: Pavel Rabinovich, Richmond Hill (CA); Anton Sotnikov, Richmond Hill (CA); Yuriy Rusakov, Newmarket (CA)

(73) Assignees: SUZOHAPP Canada ULC, Woodbridge (CA); Scan Coin AB, Malmo (SE)

(*) Notice: Subject to any disclaimer, the term of this patent is extended or adjusted under 35 U.S.C. 154(b) by 710 days.

(21) Appl. No.: 17/259,149

(22) PCT Filed: Jul. 10, 2019

(86) PCT No.: PCT/SE2019/050686
§ 371 (c)(1),
(2) Date: Jan. 8, 2021

(87) PCT Pub. No.: WO2020/013757
PCT Pub. Date: Jan. 16, 2020

(65) Prior Publication Data

US 2021/0174628 A1 Jun. 10, 2021

(30) Foreign Application Priority Data

Jul. 10, 2018 (SE) .................................... 1850874-7

(51) Int. Cl.
*G07D 11/18* (2019.01)
*G07D 11/125* (2019.01)
(Continued)

(52) U.S. Cl.
CPC ........... *G07D 11/18* (2019.01); *G07D 11/125* (2019.01); *G07D 11/14* (2019.01); *G07D 11/40* (2019.01);
(Continued)

(58) Field of Classification Search
CPC .............. B65H 29/58; B65H 2404/561; B65H 2404/1151; G07D 11/18
See application file for complete search history.

(56) References Cited

U.S. PATENT DOCUMENTS 3,180,481 A * 4/1965 Brause ...................... B07C 1/18 271/69
4,420,153 A 12/1983 Winkler et al.
(Continued)

FOREIGN PATENT DOCUMENTS

EP 0 407 151 A2 1/1991
WO WO 2002/102696 A1 12/2002
WO WO 2008/111155 A1 9/2008

OTHER PUBLICATIONS

International Search Report and Written Opinion mailed Sep. 9, 2019 in connection with International Application No. PCT/SE2019/050686.

*Primary Examiner* — Howard J Sanders
(74) *Attorney, Agent, or Firm* — Wolf, Greenfield & Sacks, P.C.

(57) ABSTRACT

A note directing device (1) comprises a first note feeder (11), a brushed roller (2), and a second note feeder (12); wherein: the first note feeder (11) feeds the bank note (10) along a direction (A) tangential to a bank note (10) surface and presents the leading edge (14) of the bank note (10) to the brushed roller (2); the brushed roller (2) engages with the bank note (10) and rotates in a direction (B) such that the leading edge (14) is directed towards the second note feeder (12); the second note feeder (12) accepts the leading edge
(Continued)

(14) and feeds the bank note (10) along a direction (C) tangential to a bank note (10) surface; wherein the brushed roller (2) comprises an axis (4) and bristles (6), each bristle (6) being attached at one end to the axis (4) and extending radially from said axis (4), the distribution of bristles (6) extending along a longitudinal direction (E) of the axis (4).

14 Claims, 16 Drawing Sheets

(51) Int. Cl.
*G07D 11/14* (2019.01)
*G07D 11/40* (2019.01)
*G07F 19/00* (2006.01)

(52) U.S. Cl.
CPC .......... *G07F 19/202* (2013.01); *G07F 19/203* (2013.01); *G07D 2211/00* (2013.01)

(56) References Cited

U.S. PATENT DOCUMENTS

| | | | | |
|---|---|---|---|---|
| 5,049,947 | A * | 9/1991 | Fish | G03G 15/6573 271/291 |
| 6,929,262 | B2 * | 8/2005 | Hostettler | B65H 29/58 271/304 |
| 8,167,304 | B2 * | 5/2012 | Fukazawa | B65H 29/58 271/225 |
| 8,628,081 | B2 * | 1/2014 | Michels | B65H 29/58 902/15 |
| 8,678,369 | B2 * | 3/2014 | Hidaka | G03G 15/6544 270/32 |
| 2006/0169770 | A1 | 8/2006 | Koshizuka et al. | |
| 2007/0228151 | A1 | 10/2007 | Yokoi et al. | |
| 2009/0152805 | A1 | 6/2009 | Nomiyama et al. | |
| 2016/0207722 | A1 | 7/2016 | Holland-Letz et al. | |
| 2017/0174376 | A9 | 6/2017 | Brunschwiler et al. | |
| 2017/0283211 | A1 | 10/2017 | Moriwaki et al. | |

* cited by examiner

DEVICE, AN APPARATUS AND A METHOD FOR DIRECTING BANK NOTES

RELATED APPLICATIONS

This Application is a national stage filing under 35 U.S.C. 371 of International Patent Application Serial No. PCT/SE2019/050686, filed Jul. 10, 2019, entitled "A DEVICE, AN APPARATUS AND A METHOD FOR DIRECTING BANK NOTES". Foreign priority benefits are claimed under 35 U.S.C. § 119(a)-(d) or 35 U.S.C. § 365 (b) of Swedish application number 1850874-7, filed Jul. 10, 2018. The entire contents of these applications are incorporated herein by reference in their entirety.

TECHNICAL FIELD

The present invention relates, in general, to devices, apparatuses, and methods for guiding bank notes in cash systems.

BACKGROUND

Cash systems are prevalent in the society and include e.g. automated cash registers at the check-out desks of supermarkets, back-office note recycling systems in stores and banks, automated teller machines (ATMs) on the high streets, and cash transport units for transporting cash between various other cash systems.

Cash systems are used for example to count, sort, store, dispense, and/or deposit cash. In doing so, the cash system often performs the action of conveying and guiding bank notes from one location to another location. The conveying and the guiding may be implemented in many different ways.

For example, in U.S. Pat. No. 8,025,282 a bank note may be deviated from a reference path to a deviated path. Diversion elements have and arched diverting profile and in a deviated position, the diverting profile is on the reference path and deviates the bank note along the deviated path.

Another example is EP1466303, wherein an apparatus comprises a transport belt component in communication with the notes, wherein a note storage component is configured to receive notes from the transport belt component and dispense notes to the transport belt component. A note direction changer is configured to direct notes into and out or past a storage component. The note direction changer comprises a wheel made of rubber. The direction of notes is changed by turning the currency around the wheel.

Although these and other implementations of cash systems are fully functional, the guiding of bank notes in cash systems may be improved.

SUMMARY

It is an object of the invention to improve the guiding of bank notes in cash systems. It is further an object to enable guiding of bank notes in cash systems in a manner which is insensitive to the origin and condition of the bank notes. Furthermore, it is an object to enable guiding of bank notes in cash systems in a manner which reduces wear on the bank notes and wear on the cash system components.

These and other objects of the invention are at least partly met by the invention as defined in the independent claims. Preferred embodiments are set out in the dependent claims.

The inventors have realized that there is a need for a new guiding means for bank notes which is insensitive to their origin and condition as these factors may affect how the bank note engages the guiding means. Bank notes of different origin (e.g. coming from different countries) may have different sizes. They may also be made from different materials (with e.g. varying composition of paper, cotton, linen, silk, and polymers) and therefore have different stiffness and texture. Furthermore, the condition of the bank notes may vary. Wear and tear, folds and creases as well as whether the note is dry or moist may vary from one bank note to another. Furthermore, depending on the condition of the bank note it may also have torn edges or edges which are prone to tearing. The mentioned factors may affect how the bank note engages the guiding means, at which angle it approaches the guiding means, how well it conforms to the guiding means and how likely it is to fold or break when it engages the guiding means.

The most common guiding means on the market is based on flaps which act as a static guide for the bank note. A problem with flaps, as realized by the inventors, is that they may be prone to cause jams for soft/worn bank notes moving at high speed. A possible reason may be that the flap is static and does not move with the bank note. For example, if a bank note edge is fed into the static flap at slightly the wrong angle, a soft bank note may fold in the wrong direction instead of sliding across the flap surface as intended and the bank note may crumple and jam.

An alternative guiding means is a rubber wheel note direction changer which rotate and guide the bank note along the outer perimeter of the rubber wheel by turning the bank note around the wheel. The inventors have realized that the rubber wheel note direction changer may handle soft/worn bank notes better than the static flap but that in some configurations it may be worse at handling stiff bank notes. A stiff bank note may not conform to the outer perimeter of the rubber wheel in the same manner as a soft bank note and it may be impossible to bend the stiff bank note to the extent needed to make it move from one note feeder to another.

According to a first aspect of the invention, there is provided a note directing device for controlling a path of a bank note, comprising a first note feeder, a brushed roller, and a second note feeder;

wherein the note directing device in a first operation mode is configured to control a movement of the bank note along a first path from the first note feeder via the brushed roller to the second note feeder such that:

- the first note feeder is configured to feed the bank note along a direction tangential to a surface of the bank note such that a leading edge of the bank note is presented to the brushed roller;
- the brushed roller is configured to engage with the bank note and rotate in a direction such that the leading edge of the bank note is directed towards the second note feeder;
- the second note feeder is configured to accept the leading edge of the bank note and to feed the bank note along a direction tangential to a surface of the bank note;

wherein the brushed roller comprises an axis and bristles, each bristle being attached at one end to the axis and extending radially from said axis, the distribution of bristles extending along a longitudinal direction of the axis.

The invention may provide a guiding means which handles soft/worn bank notes as well as stiff bank notes. Since the brushed roller rotates it may redirect a soft bank note even if the bank note hits the brushed roller at slightly the wrong angle. The movement of the bank note's leading edge from the first note feeder to the second note feeder is not only dependent on the movement of the first note feeder but also on the movement of the brushed roller. The bristles rotationally attack the bank note and may actively push the bank note along onto the correct path towards the second note feeder. At the same time the brushed roller may handle stiff bank notes better than a rubber wheel would as the bristles may be made less rigid than a solid rubber wheel. The bristles may be made such that they to some extent flex and allow the path of a stiff bank note to have a slightly larger curvature than the path of a soft bank note. Thus, by using a brushed roller a stiff bank note may not be forced to conform to the outer perimeter of the guiding means in the same manner as if a solid rubber wheel was used.

Furthermore, the bristles may flex individually such that if e.g. one corner of the bank note hits one part of the brushed roller first, the bristles at that part may flex while the bristles at another part of the brushed roller are unaffected until the bank note engages them. In contrast, for a solid rubber wheel the entire wheel or at least a large part of the wheel would have to flex at once. Bristles that flex individually may also have the advantage that the brushed roller may engage a longer segment of the bank note than a solid rubber wheel could. The term "long" here refers to the length of the segment in the direction of the movement of the bank note. Engaging a long segment may be advantageous as the direction of the leading edge may be more accurately defined.

Additionally, circumferential gaps between the bristles may allow the leading edge of the bank note to move in between the bristles such that the rotating bristles hit the side of the bank note rather than the edge itself. This may be a better way of guiding the bank note than using a rubber wheel wherein the initial guiding is dependent on the first contact between the bank note and the rubber wheel. The brushed roller may therefore be less sensitive to bank notes coming in at slightly the wrong angle. The bristles may also reduce the wear and tear on the edge of the bank note and the risk of an already damaged edge ripping. The likelihood of future jams may thereby be reduced.

Furthermore, the contact area between the bank note and the guiding means may be smaller when a brushed roller is used compared to when a solid wheel is used as the bristles may be spaced apart. A smaller contact area may reduce the wear and tear on the bank note and may also reduce the buildup of static electricity on the bank note, which may reduce the likelihood of future jams.

A note directing device according to the inventive concept may improve guiding of bank notes along a single route wherein the note directing device facilitates the bank note moving from one note feeder to another. Thus the route does not need to be defined by a single note feeder, instead several note feeders may be used and the notes are directed from one note feeder to another by brushed rollers. Using several note feeders rather than one single note feeder may make manufacturing or servicing easier or cheaper. A note directing device according to the inventive concept may also improve the diversion of bank notes from one route to another. By making the diversion more accurate a note directing device according to the inventive concept may reduce the error probability when cash is counted, sorted, stored, dispensed, or deposited. Furthermore, the risk of jams during counting, sorting, storing, dispensing, or depositing of cash may be reduced.

It should be understood that the first and second note feeders may have different feeding directions, e.g. orthogonal feeding directions, in which case the brushed roller may facilitate a needed change in the direction of movement of the leading edge of the bank note. However, the first and second note feeders may also have the same feeding direction, in which case the brushed roller may help the leading edge of the bank note to stay on the correct path during the transition from the first to the second note feeder.

According to an embodiment, the bristles of the brushed roller are configured such that the bristles make contact with at least one of the first and second note feeder when the brushed roller is rotated. An advantage of the brushed roller being in contact with the first note feeder is that the brushed roller may engage the bank note already before the leading edge has left the first note feeder. This means that the leading edge of the bank note may be set on the correct path at an early stage. An advantage of the brushed roller being in contact with the second note feeder is that the brushed roller may guide the bank note all the way up to the second note feeder, thereby ensuring that the bank note does not stray away from the correct path before the second note feeder has a good chance of accepting it.

According to an embodiment, the bristles in contact with the at least one note feeder are configured to conform to the surface of the at least one note feeder by bending. This way the brushed roller may be arranged so that it reaches into corners. In many cash systems the leading edge of a bank note emerges at a gap between two co-acting rollers or belts, the gap forming a concave corner. When using a static flap or a solid rubber wheel as guiding means it may not be possible to arrange it such that it reaches into the corner. Instead the guiding means may be positioned so that the bank note is fed some distance out from the corner before it engages the guiding means. When using a brushed roller, the bent bristles may reach further into the corner such that they engage the bank note at an early stage and leads it onto the correct path.

Another advantage may be that the need for service of the guiding means is reduced. For example, a rotating solid rubber wheel in contact with a moving note feeder is worn down so that the diameter of the wheel is reduced. This leads to a reduced ability to pick up a bank note being fed from the note feeder and the rubber wheel therefore needs to be replaced relatively frequently. In contrast, when a brushed roller is used instead of the rubber wheel the bristles may bend and drag along the surface of the note feeder. The bristles may in this manner also be worn but this may result in the bristles being thinned down rather than the diameter of the brushed roller being reduced. Hence, the brushed roller may not need to be replaced as often.

According to an embodiment, the bristles are arranged to extend in a plurality of different angular directions distributed over an entire circumference of the axis of the brushed roller. In this manner the bristles may engage with the bank note regardless of the rotational position of the axis of the roller.

According to an embodiment, a plurality of sets of bristles is arranged to be distributed along the longitudinal direction of the axis, wherein the bristles of each set of bristles are arranged to extend in a plurality of different angular directions distributed over an entire circumference of the axis of the brushed roller. An advantage of using sets of bristles is e.g. that gaps may be left between the sets. This may reduce the wear on the bank notes while still ensuring that bristles engage with the bank note across a substantial part of the leading edge. Furthermore, it may simplify mounting and service as the sets may be mounted or replaced individually. The sets of bristles may also be different from each other. The length and/or stiffness of the bristles in a set of bristles which is configured to engage with the central part of the leading edge of a bank note may be different from the length and/or stiffness of those which are configured to engage with the outer part of the leading edge.

According to an embodiment, at least one note feeder comprises two co-acting belts, wherein the note feeder is configured to feed the bank note along a direction tangential to a surface of the bank note by sandwiching the bank note between the two co-acting belts and moving the two co-acting belts in the direction tangential to a surface of the bank note. An advantage with this arrangement is that the bank note may be held secure between the belts regardless of the path of the belts. A single note feeder comprising two co-acting belts may therefore transport the bank note along distances and/or along a non-straight path without the bank note needing to be shifted from one note feeder to another. The belts may be driven by pulleys and the pulleys at the point where the co-acting belts deliver the bank note to the brushed roller may be small as this may not affect the ability of the note feeder to transport the bank notes. Using small pulleys at this point may create a corner which is easier to access for the bristles. In contrast, when co-acting rollers are used as a note feeder they may need to have a large diameter to ensure a good grip on the bank note. The large diameter of the co-acting rollers may in this case make it more difficult to arrange the brushed roller such that the bristles reach far enough into the corner.

According to an embodiment, the brushed roller has a rotational speed such that the end of the bristle that is furthest away from the axis is moving with a linear speed that is faster than a speed of the bank note being fed by the first or the second note feeder. An advantage of such an embodiment may be that it ensures that the bristle will engage with the leading edge of the bank note at an early stage. The bank note may not be allowed to move too far in between the spaces of the bristles before the bristles hit the bank note and start to redirect it. The bristles moving faster than the bank note may ensure that the bank note is redirected before it hits the axis.

According to an embodiment, the brushed roller has a rotational speed wherein the brushed roller has a rotational speed such that the end of the bristle that is furthest away from the axis is moving with a linear speed that is faster than a speed of the leading edge of the bank note. This may be advantageous to ensure that the brushed roller is able to correctly redirect the leading edge of the bank note.

According to another embodiment, the brushed roller has a rotational speed such that at least one bristle engages the bank note within the time it takes the bank note to travel a distance, the distance being half the length of a bristle, after the bank note being presented to the brushed roller. This may be advantageous as it may ensure that it is primarily the upper half of the bristles that is redirecting the leading edge of the bank note. The upper half of the bristles may be more flexible than the lower half, close to the axis. Furthermore, the bank note may not be allowed to move too far in between the spaces of the bristles before the bristles hit the bank note and start to redirect it. Thus the bank note may be redirected before it hits the axis.

According to an embodiment, the bristles are made of electrically conductive material. An advantage of such bristles may be that they can reduce the build-up of static electricity on the bank note as it passes the brushed roller. Electrically conductive bristles may also form a path for electrical charges already on the bank note such that the brushed roller may perform the action of simultaneously directing and discharging the bank note.

According to an embodiment, the note directing device is, in a second operation mode, configured to control a movement of the bank note along a second path from the second note feeder via the brushed roller to the first note feeder such that:

- the second note feeder is configured to feed the bank note along a direction tangential to a surface of the bank note such that a leading edge of the bank note is presented to the brushed roller;
- the brushed roller is configured to engage with the bank note and rotate in a direction such that the leading edge of the bank note is directed towards the first note feeder;
- the first note feeder is configured to accept the leading edge of the bank note and to feed the bank note along a direction tangential to a surface of the bank note.

An advantage of such an embodiment may be that the direction of the bank note may be reversed so that it may be transported either from the first note feeder to the second note feeder or from the second note feeder to the first note feeder. Thus the same note directing device may be used to direct a bank note into and out of a specific part of the cash system. The action of reversing the direction of the bank note may also be used to correct an error, e.g. if the bank note accidentally has been folded or if it has entered the wrong path.

According to an embodiment, the note directing device is not only configured to transport a bank note between a first and a second note feeder. The note directing device further comprises a third note feeder;

wherein the note directing device in a third operation mode is configured to control a movement of the bank note along a third path from the first note feeder via the brushed roller to the third note feeder such that:

- the first note feeder is configured to feed the bank note along a direction tangential to a surface of the bank note such that a leading edge of the bank note is presented to the brushed roller;
- the brushed roller is configured to engage with the bank note and rotate in a direction such that the leading edge of the bank note is directed towards the third note feeder;
- the third note feeder is configured to accept the leading edge of the bank note and to feed the bank note along a direction tangential to a surface of the bank note;

The note directing device may thus select whether the bank note should be transported from the first note feeder to the second note feeder or from the first note feeder to the third note feeder. The note directing device may hence act as a route selector for the bank note. The different routes may e.g. be selected depending on the denomination or origin of the bank note or whether the bank note should be stored or further processed or whether the bank note is damaged or not.

According to an embodiment, the note directing device comprising a third note feeder is configured, in a fourth operation mode, to control a movement of the bank note along a fourth path from the third note feeder via the brushed roller to the first note feeder such that:

- the third note feeder is configured to feed the bank note along a direction tangential to a surface of the bank note such that a leading edge of the bank note is presented to the brushed roller;
- the brushed roller is configured to engage with the bank note and rotate in a direction such that the leading edge of the bank note is directed towards the first note feeder;

the first note feeder is configured to accept the leading edge of the bank note and to feed the bank note along a direction tangential to a surface of the bank note.

The note directing device may thus act as a route selector for the bank note wherein both routes are reversible. The bank note may be transported either from the first note feeder to the second note feeder and reversed or from the first note feeder to the third note feeder and reversed. For example, the second note feeder may be connected to a storage unit for bank notes of a specific denomination while the third note feeder may be connected to a storage unit for bank notes of another denomination. Bank notes may thus be deposited from the first note feeder into either storage unit or withdrawn from either storage unit into the first note feeder. Alternatively, the second note feeder may be connected to a primary storage unit for bank notes of a specific denomination while the third note feeder is connected to a secondary storage unit for bank notes of the same denomination.

According to a second aspect of the present inventive concept there is provided a cash recycling apparatus, said cash recycling apparatus comprising:

a note directing device according to the first aspect, a note access opening connected to the first note feeder and a note storage unit connected to the second note feeder, the note access opening being configured to provide human access to a bank note and the note storage unit being configured to store notes;

wherein the first operation mode directs the bank note from the note access opening to the note storage unit, thereby performing a bank note deposit; and the second operation mode directs the bank note from the note storage unit to the note access opening, thereby performing a bank note withdrawal.

The cash recycling apparatus may thus provide a means to store bank notes in a secure manner, wherein bank notes may be controllably deposited and withdrawn. The storage unit may be inaccessible to unauthorized persons, e.g. only store personnel may access it, or only authorized service technicians may access it. The withdrawal or deposit may be registered such that e.g. a customer's account is charged or credited. Furthermore, the cash recycling apparatus may be configured to only perform the withdrawal or deposit conditional on a transaction approval. The transaction approval may e.g. be based on the account having enough funds, the bank note being of an approved origin or denomination, the bank note not being damaged.

Effects and features of this second aspect are largely analogous to those described in connection with the first aspect. Embodiments mentioned in relation to the first aspect are largely compatible with the second aspect.

According to a third aspect of the present inventive concept there is provided a method for directing a bank note, wherein the bank note can be directed along a first path by controlling a first note feeder, a brushed roller, and a second note feeder, wherein the brushed roller comprises an axis and bristles, each bristle being attached at one end to the axis and extending radially from said axis, the distribution of bristles extending along a longitudinal direction of the axis; said method comprising:

receiving a first path selection signal, indicating a desired bank note movement along the first path from the first note feeder via the brushed roller to the second note feeder;

in response to receiving the first path selection signal, setting a feeding direction and a feeding speed of the first note feeder such that it presents the leading edge of the bank note to the brushed roller, the feeding direction of the first note feeder being a direction tangential to a surface of the bank note;

in response to receiving the first path selection signal, setting the rotational direction and rotational speed of the brushed roller such that it engages the bank note presented by the first note feeder and directs the leading edge of the bank note towards the second note feeder;

in response to receiving the first path selection signal, setting a feeding direction and a feeding speed of the second note feeder such that it accepts the leading edge of the bank note from the brushed roller, the feeding direction of the second note feeder being a direction tangential to a surface of the bank note.

Effects and features of the third aspect are largely analogous to those described in connection with the first and the second aspect. Embodiments mentioned in relation to the first and second aspect are largely compatible with the third aspect.

The inventive concept may thus provide a method for directing a bank note wherein the method may improve the handling of bank notes of different origin and condition, reduce the risk of jams for soft/worn bank notes, improve the handling of stiff bank notes, reduce the wear on the bank notes or reduce the wear on the components of the note directing device.

According to an embodiment of the third aspect a method is provided, wherein the bank note additionally can be directed along a second path by controlling the first note feeder, the brushed roller, and the second note feeder; said method comprising:

receiving a second path selection signal, indicating a desired bank note movement along the second path from the second note feeder via the brushed roller to the first note feeder;

in response to receiving the second path selection signal, setting the feeding direction and the feeding speed of the second note feeder such that it presents the leading edge of the bank note to the brushed roller, the feeding direction of the second note feeder being a direction tangential to a surface of the bank note;

in response to receiving the second path selection signal, setting the rotational direction and rotational speed of the brushed roller such that it engages the bank note presented by the second note feeder and directs the leading edge of the bank note towards the first note feeder;

in response to receiving the second path selection signal, setting the feeding direction and feeding speed of the first note feeder such that it accepts the leading edge of the bank note from the brushed roller, the feeding direction of the first note feeder being a direction tangential to a surface of the bank note.

The method may thus provide a way to use a single brushed roller to direct a bank note in a reversible manner from one note feeder to another. Thus the directing device, operated according to the method, may be used to direct a bank note into and out of a specific part of the cash system. The action of reversing the direction of the bank note may also be used to correct an error, e.g. if the bank note accidentally has been folded or if it has entered the wrong path.

According to an embodiment of the third aspect a method is provided, wherein the bank note additionally can be directed along a third and a fourth path by controlling a third note feeder in addition to the first note feeder, the brushed roller, and the second note feeder; said method further comprising:

receiving a third path selection signal, indicating a desired bank note movement along the third path from the first note feeder via the brushed roller to the third note feeder;

in response to receiving the third path selection signal, setting the feeding direction and the feeding speed of the first note feeder such that it presents the leading edge of the bank note to the brushed roller, the feeding direction being a direction tangential to a surface of the bank note;

in response to receiving the third path selection signal, setting the rotational direction and rotational speed of the brushed roller such that it engages the bank note presented by the first note feeder and directs the leading edge of the bank note towards the third note feeder;

in response to receiving the third path selection signal, setting a feeding direction and a feeding speed of the third note feeder such that it accepts the leading edge of the bank note from the brushed roller, the feeding direction of the third note feeder being a direction tangential to a surface of the bank note;

receiving a fourth path selection signal, indicating a desired bank note movement along the fourth path from the third note feeder via the brushed roller to the first note feeder;

in response to receiving the fourth path selection signal, setting the feeding direction and the feeding speed of the third note feeder such that it presents the leading edge of the bank note to the brushed roller, the feeding direction being a direction tangential to a surface of the bank note;

in response to receiving the fourth path selection signal, setting the rotational direction and rotational speed of the brushed roller such that it engages the bank note presented by the third note feeder and directs the leading edge of the bank note towards the first note feeder;

in response to receiving the fourth path selection signal, setting the feeding direction and the feeding speed of the first note feeder such that it accepts the leading edge of the bank note from the brushed roller, the feeding direction being a direction tangential to a surface of the bank note;

The method may thus provide a way to use a single brushed roller to direct a bank note between three different note feeders in a reversible manner. A note directing device, operated according to the method, may thus select whether the bank note should be transported from the first note feeder to the second note feeder or from the first note feeder to the third note feeder. The method may thus select the route of the bank note. The different routes may e.g. be selected depending on the denomination or origin of the bank note or whether the bank note should be stored or further processed or whether the bank note is damaged or not.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

The present invention will now be described more fully hereinafter with reference to the accompanying drawings, in which currently preferred embodiments of the invention are shown. The invention may, however, be embodied in many different forms and should not be construed as limited to the embodiments set forth herein; rather, these embodiments are provided for thoroughness and completeness, and fully convey the scope of the invention to the skilled person.

In the most general form of the inventive concept the note directing device comprises two note feeders. However, in other embodiments the note directing device may comprise more than two note feeders, e.g. three note feeders. It should be understood that when features are described in an embodiment comprising only two note feeders the description is also applicable to embodiments comprising three note feeders.

Figure 3:
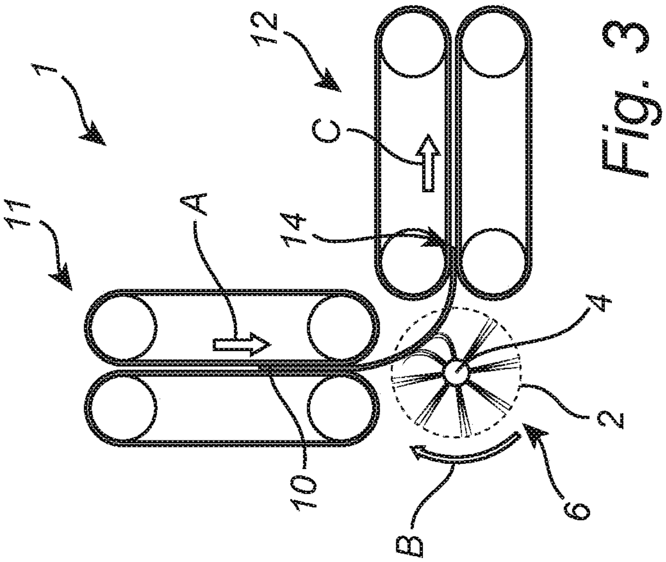
FIG. 1-3 are side views illustrating operation of a note directing device. The illustration being in the form of a time series.
Figure 2:
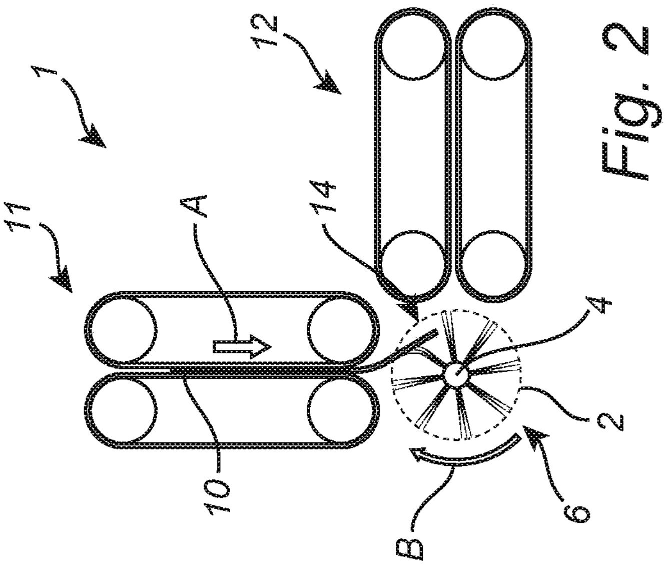
Figure 1:
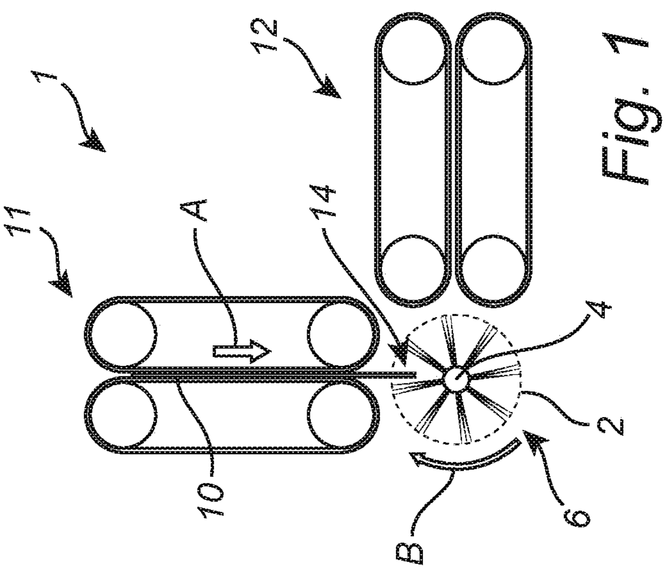

In a first embodiment of the invention, shown in FIG. 1-3, the note directing device 1 comprises a first note feeder 11, a second note feeder 12 and a brushed roller 2. In a first operation mode the note directing device 1 is configured to control the movement of a bank note 10 such that the bank note 10 is transported from the first note feeder 11 to the second note feeder 12. The first note feeder 11 is configured to feed the bank note 10 along a direction A, tangential to a surface of the bank note 10, such that a leading edge 14 of the bank note 10 is presented to the brushed roller 2. The brushed roller 2 is configured to engage with the bank note 10 and rotate in a rotational direction B such that the leading edge 14 of the bank note 10 is directed towards the second note feeder 12. The second note feeder 12 is configured to accept the leading edge 14 of the bank note 10 and to feed the bank note 10 along a direction C, tangential to a surface of the bank note 10. FIG. 1-3 represents a time series, seen in a side view perspective, of the transport of a bank note 10.

The time series start with FIG. 1 corresponding to a point in time when the bank note 10 is presented to the brushed roller 2. The first note feeder 11 has a feeding direction A such that the leading edge 14 of a bank note 10 is presented to the brushed roller 2. The time series continues with FIG. 2 corresponding to a point in time when the brushed roller 2 has started to bend the bank note 10 such that the leading edge 14 has started to move towards the second note feeder 12. The time series further continues with FIG. 3, corresponding to the point in time when the second note feeder 12 has started feeding the bank note 10.

Figure 4:
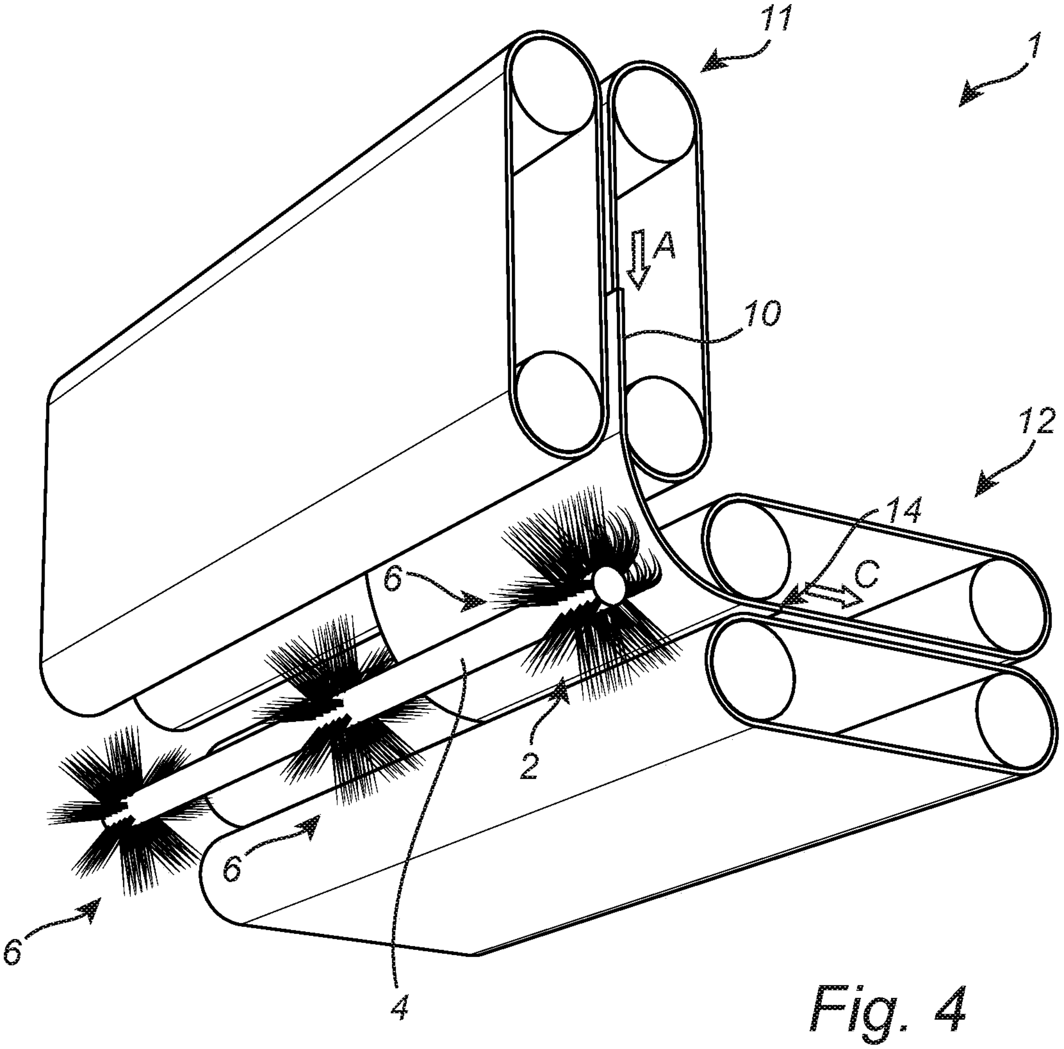
FIG. 4 is a perspective view of a note directing device.
Figure 5A:
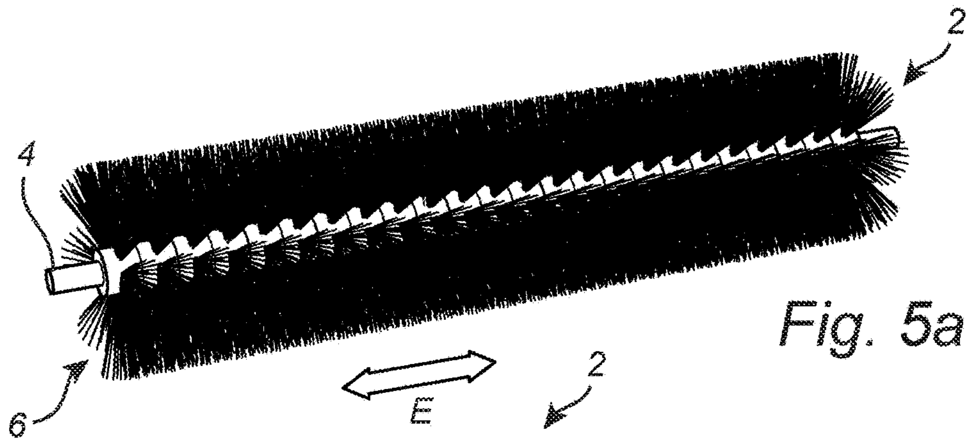
FIG. 5 *a-d* are perspective views of brushed rollers.
Figure 5B:
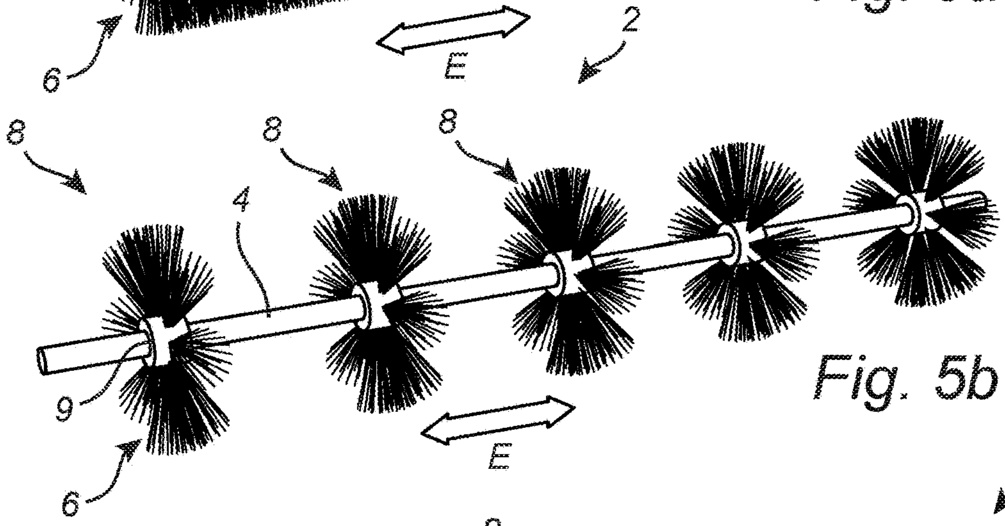
Figure 5C:
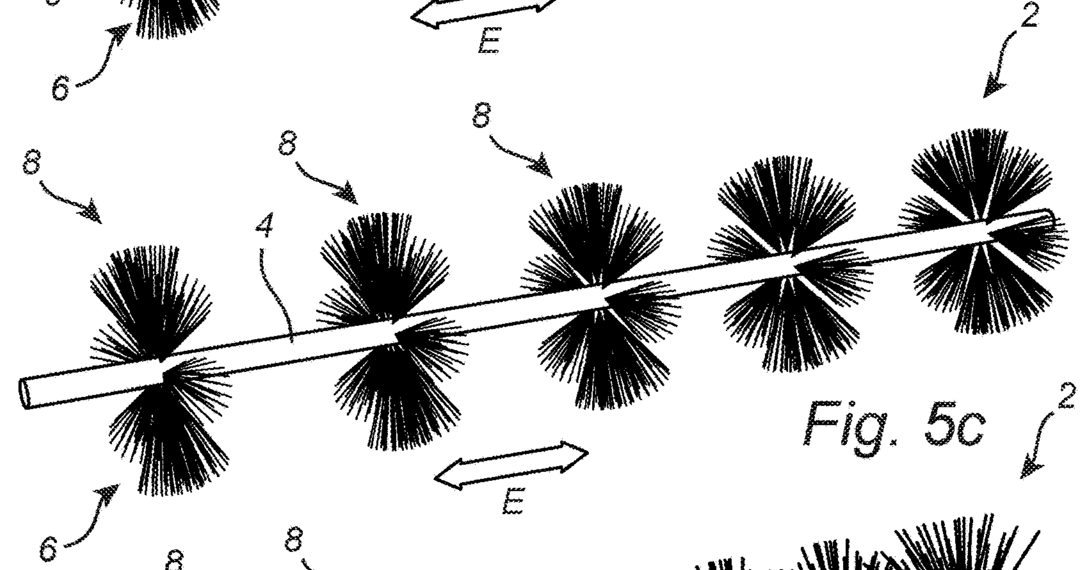
Figure 5D:
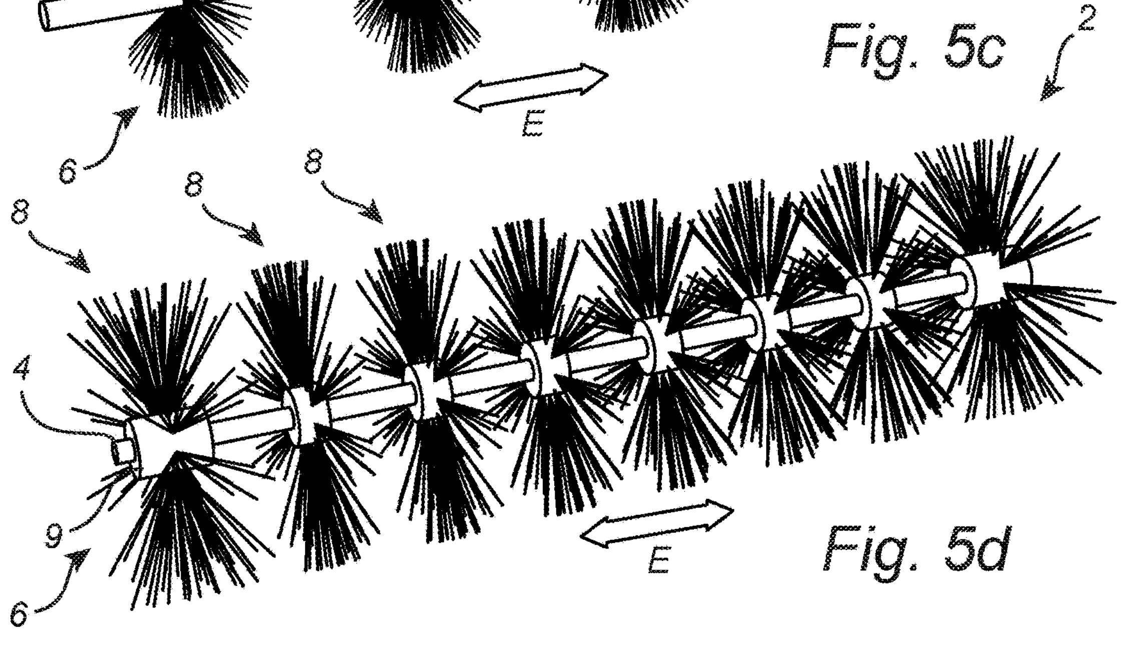
Figure 6A:
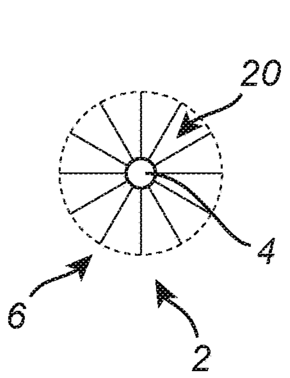
FIG. 6 *a-e* are side views of brushed rollers.
Figure 6B:
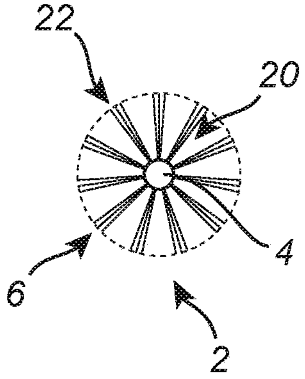
Figure 6C:
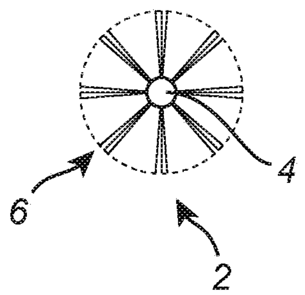
Figure 6D:
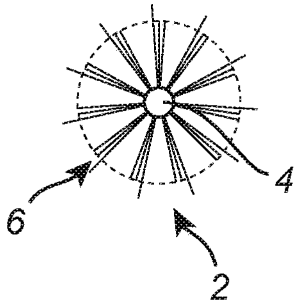
Figure 6E:
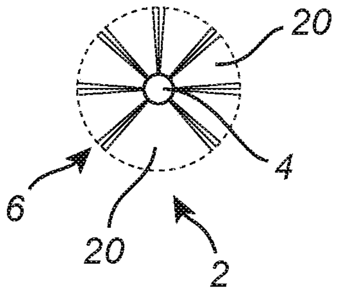

A perspective view of one embodiment of the invention is seen in FIG. 4. Here, the bank note 10 is shown in a position corresponding to the point in time shown in FIG. 3.

FIG. 5 *a-d* show various embodiments of the brushed roller 2, seen in perspective view. The brushed roller 2 comprises an axis 4 and bristles 6, each bristle 6 being attached at one end to the axis 4 and extending radially from said axis 4, the distribution of bristles 6 extending along a longitudinal direction E of the axis 4. FIG. 5*a* shows an embodiment wherein the bristles 6 are distributed evenly along the longitudinal direction E of the axis 4. FIG. 5*b* shows an embodiment wherein the bristles 6 are arranged in a plurality of sets 8 of bristles 6, wherein the sets are arranged to be distributed along the longitudinal direction E of the axis 4. The sets 8 of bristles 6 may be arranged such that longitudinal gaps are formed between them. The sets 8 may be individually replaceable. For example, each set 8 may comprise a collar 9 with attached bristles 6. The collar 9 may be slid onto the axis 4 and fixed to the axis 4 using a set screw or another fastening means. The sets 8 of bristles 6 may of course also be attached directly to the axis 4 as seen in FIG. 5*c*. The sets 8 of bristles 6 do not have to be identical as exemplified in FIG. 5*d*. The extension of a set 8 along the longitudinal direction E of the axis 4 may vary from one set 8 to another set 8. Furthermore, the bristles 6 may vary from one set 8 to another set 8 in terms of length, stiffness, electrical conductivity etc.

FIG. 6 shows various embodiments of the brushed roller, seen in side view. The bristles 6 may be distributed evenly or unevenly around the axis 4. Circumferential gaps 20 may be provided between the bristles 6 such that the leading edge 14 of a bank note 10 may enter in between the bristles 6. The size of the circumferential gaps 20 may vary around the circumference of the brushed roller 2 such that bunches 22 of bristles 6 are formed. The circumferential gaps 20 between bristles within a bunch 22 may be small while the circumferential gap 20 between different bunches 22 may be large. The large circumferential gaps 20 may e.g. be configured to effectively accept the leading edge 14 of the bank note 10. The small circumferential gaps 20 may e.g. be configured to give a desired flexibility of the bunch 22 of bristles 6 by setting how densely the bristles 6 are spaced. The number of bristles 6 and the distribution around the circumference of the brushed roller 2 may e.g. be configured according to the intended rotational speed B of the brushed roller 2 or the bending stiffness of the individual bristles. For example, a faster rotational speed may require larger circumferential gaps 20. Furthermore, a bunch 22 of bristles 6 comprising a large amount of soft bristles 6 may have the same stiffness as a bunch 22 of bristles 6 comprising a small amount of stiff bristles 6.

The bristles 6 may be made from a number of materials, regardless of how they are distributed around the axis 4. Examples of bristle 6 materials are polymers, nylon, polyamide, PVC, metal, or natural fibers. In one embodiment, bristles 6 are made from an electrically conductive material such as e.g. a polymer material (e.g. thermoplastic material or polycarbonate material) containing e.g. carbon powder or carbon fibers. Bristles 6 made of an electrically conductive material may be grounded, e.g. via an electrically conductive axis 4, such that charges may be removed from a bank note 10 as it passes. It should be understood that the bristles 6 do not need to be identical around the circumference the brushed roller 2. The bristles 6 may e.g. have different length or be made of different materials to provide a combined effect of improved directing of bank notes 10.

Figure 7A:
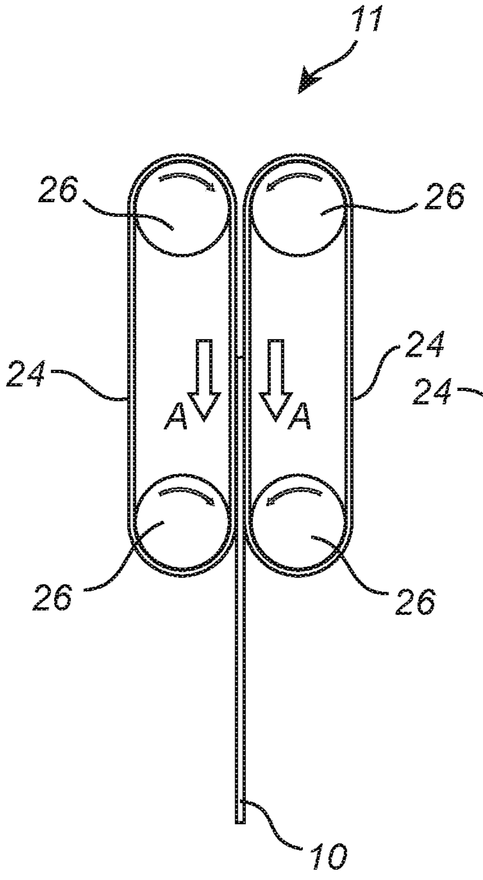
FIG. 7 *a-c* are side views of note feeders.
Figure 7B:
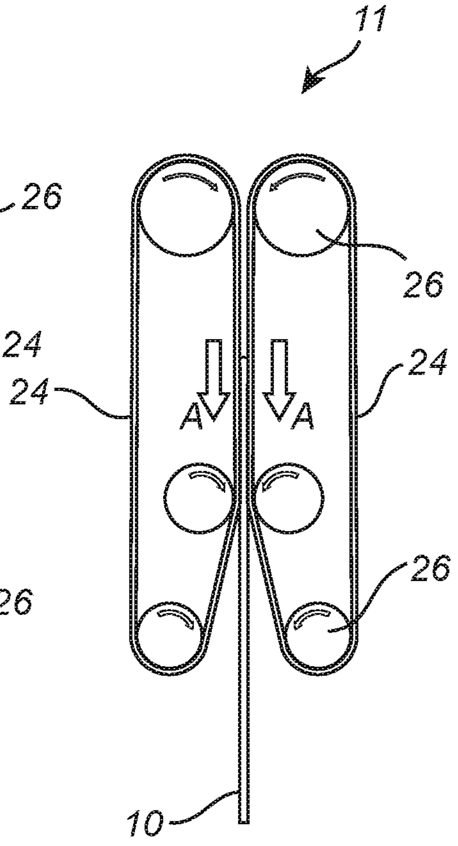
Figure 7C:
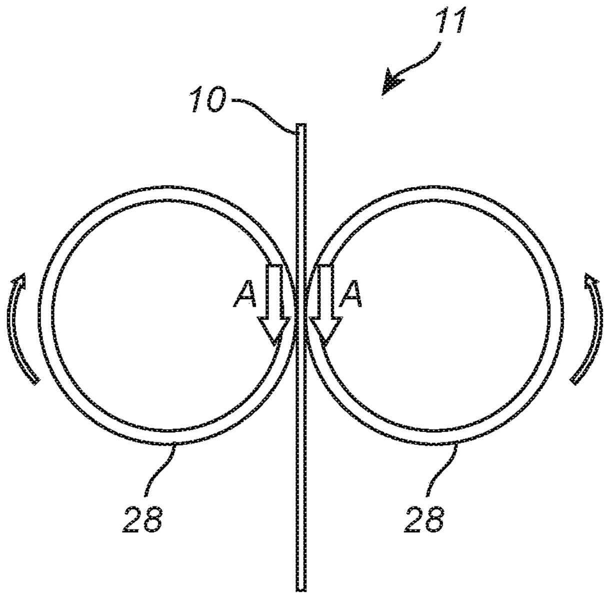

FIG. 7*a-c* show various types of note feeders, here exemplified as variations of the first note feeder 11 seen in a side view. However, it should be understood that these figures may represent a first note feeder 11, a second note feeder 12, or a third note feeder 13. Furthermore, all the note feeders in a note directing device 1 does not have to be of the same type. The note feeder may have an entry side and an exit side and may therefore act as either the first note feeder 11 or the second note feeder 12. Brushed rollers 2 may be arranged at both the entry side and the exit side such the note feeder may act simultaneously as a first note feeder 11 in relation to brushed roller 2 at one side (entry side or exit side) of the note feeder 11 and as a second note feeder 12 in relation to brushed roller 2 at an opposite side (exit side or entry side) of the note feeder 12. The note feeder may be configured such that the feeding direction may be reversed, e.g. by putting a driving mechanism in reversed gear. The note feeder may feed a bank note 10 in a direction tangential to the surface of the bank note 10. However, it may be the configuration of the note feeder which defines whether the direction tangential to the surface of the bank note 10 is horizontal, vertical or any other direction, i.e. by feeding the bank note 10 the note feeder may define which direction the bank note moves in. The note feeder may feed the bank note 10 by supplying a force tangential to the surface of the bank note 10, wherein the force may be transmitted to the bank note 10 through friction. It should be understood that the surface of the bank note refers to one of the two surfaces of the bank note 10. The bank note 10 being considered to be an essentially two-dimensional object.

The note feeder may comprise two co-acting belts 24 as illustrated in the embodiments in FIG. 7*a* and FIG. 7*b*. The belts 24 are comprised of any suitable material, including but not limited to, rubber. Each belt 24 may be connected to and rotate around at least two pulleys 26. At least one of the at least two pulleys 26 connected to a belt 24 may be powered such that the belt 24 is driven forward, other pulleys may be idling. The two co-acting belts 24 may be arranged adjacent to each other such that a bank note 10 may be sandwiched between them, both belts 24 being in contact with the bank note 10 simultaneously and pinching the bank note 10 between them. The bank note 10 may in this manner be fixed between the belts 24 such that it does not fall off. By rotating the pulleys 26 connected to the first belt 24 in a rotational direction opposite to the rotational direction of the pulleys 26 connected to the second belt 24 the two belts 24 may co-act and the bank note 10 may move together with the two co-acting belts 24, wherein direction of movement for the bank note 10 may be a direction A which is tangential to the surface of the bank note 10. By reversing the rotational direction of the powered pulleys 26 the direction of movement for the bank note 10 may be reversed. The powered pulleys 26 of the two belts 24 may be driven by individual power sources or by the same power source. Using the same power source may have the advantage that it is easier to achieve the same speed for the two co-acting belts 24.

Driving the co-acting belts 24 with the same speed reduces the wear on the bank notes 10 and reduces the risk of jams.

The belts 24 may be wider than the width of the bank note 10 such that the belts 24 cover the entire bank note 10 surface, e.g. to fully protect the bank note 10 during transport. The belts 24 may also be more narrow than the bank note 10 such that part of the surface of the bank note 10 is exposed during transport. This may e.g. enable a detector to detect the denomination, origin or condition of the bank note 10 during transport. Furthermore, the note feeder may also comprise several pairs of co-acting belts, e.g. one pair of co-acting belts 24 arranged at one lateral edge of the bank note 10 and another pair of co-acting belts 24 arranged at the other lateral edge.

The co-acting belts 24 may be arranged such that the feeding direction is the same at the entry side as at the exit side. Alternatively, the co-acting belts may be arranged such that the feeding direction at the entry side is different from the feeding direction at the exit side. For example, a bank note 10 may be accepted at the entry side and fed in a direction tangential to the surface of the bank note, the direction being a vertical direction, the route of the co-acting belts 24 may then be such that at the exit side the bank note 10 is fed in a direction tangential to the surface of the bank note, the direction being a horizontal direction. Such changes in the feeding direction may be implemented using additional pulleys 26.

The entry side and exit side of the note feeder may be arranged by placing the pulleys 26 of the opposite co-acting belts adjacent to each other as seen in the embodiment in FIG. 7*a* or separated as seen at the exit side in the embodiment in FIG. 7*b*. In another embodiment the note feeder may comprise two co-acting rollers 28 without any belts as seen in FIG. 7*c*. Such co-acting rollers 28 may be placed adjacent to each other and rotate in opposite direction to each other, thus operating in a manner analogous to co-acting belts 24.

Figure 8A:
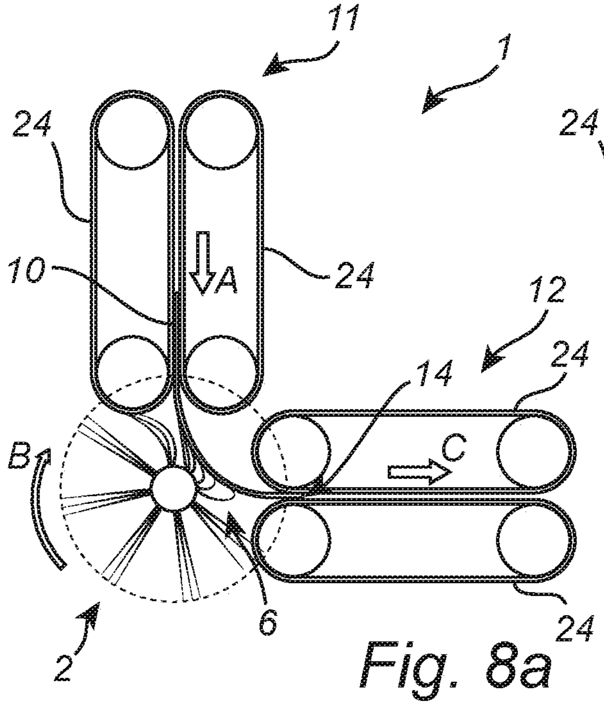
FIG. 8 *a-b* are side views of note directing devices.
Figure 9A:
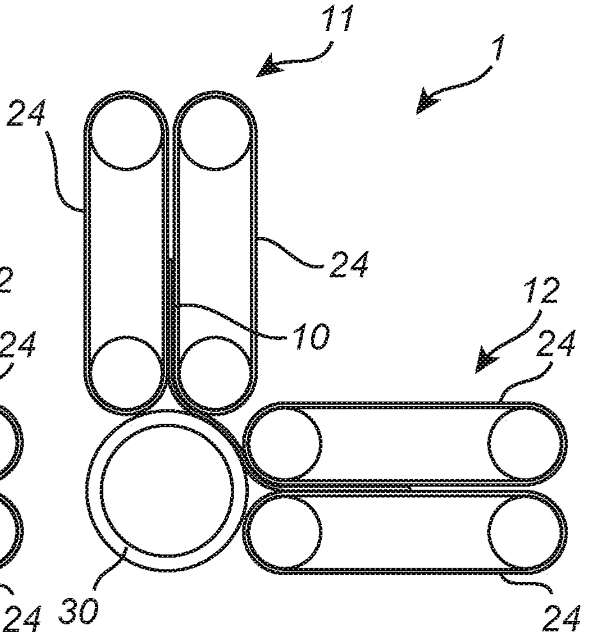
FIG. 9 *a-b* are side views of note directing devices comprising rubber wheels.

In a preferred embodiment the bristles 6 of the brushed roller 2 are soft so that the brushed roller may be mounted in such a manner that the bristles conform to the surface of at least one of the note feeders by bending. FIG. 8*a* shows an example of such an embodiment wherein the bristles conform to the surfaces of both the first note feeder 11 and the second note feeder 12. A brushed roller 2 with soft bristles 6 may be mounted so that it reaches far into the corner formed by e.g. co-acting belts 24 at the entry or exit side of the note feeder. FIG. 8*a* illustrates, in a side view of one embodiment of the note directing device 1, how the bristles may reach all the way in to the point where the co-acting belts 24 of the first note feeder 11 release the bank note 10 as well as all the way in to the point where the co-acting belts 24 of the second note feeder 12 accepts the bank note 10. In contrast, FIG. 9*a* illustrates, in a side view, a note directing device according to prior art where a rubber wheel 30 is used instead of a brushed roller. The rubber wheel 30 may not reach as far into the corners of the note feeders.

Figure 8B:
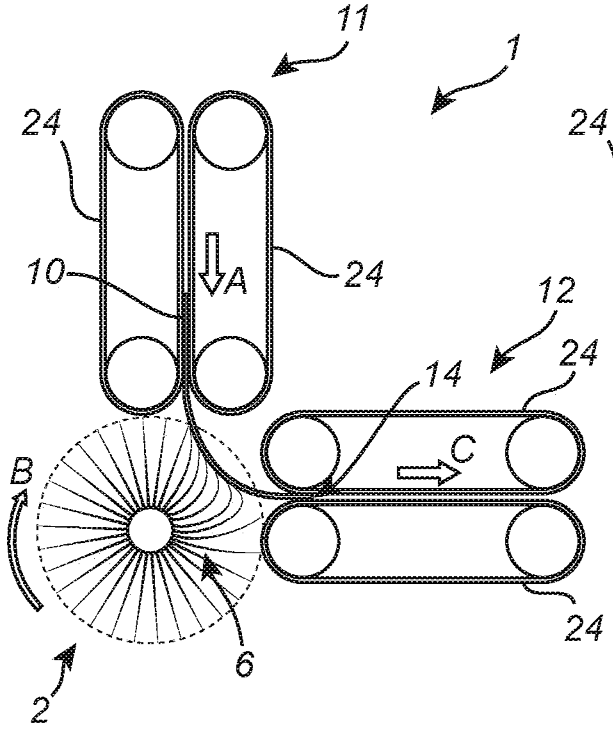
Figure 9B:
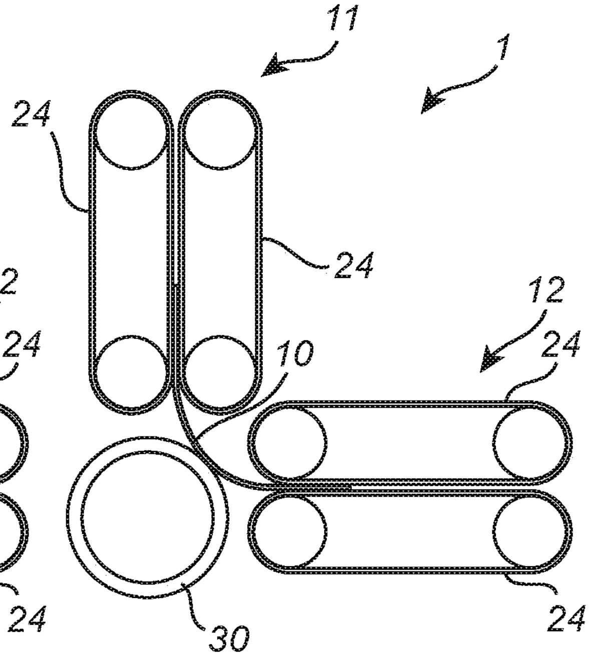

It is also preferable with an embodiment wherein the bristles 6 of the brushed roller 2 are soft enough to flex and bend when in contact with the bank note 10. As seen in FIG. 8*b*, a side view of one embodiment of the note directing device 1, both the bristles and the bank note 10 may bend during the directing of the bank note 10. This means that the bristles 6 may bend more when a stiffer bank note 10 passes than when a softer bank note 10 passes. This may allow a stiff bank note to take a path with a slightly larger curvature. Bristles 6 that flex when in contact with the bank note 10 may also have the advantage that the brushed roller 2 may engage a longer segment of the bank note than a solid rubber wheel could. FIG. 9*b* illustrates, in a side view, a note directing device according to prior art where a rubber wheel 30 is used instead of a brushed roller 2 and wherein the segment of the bank note which is engaged by the rubber wheel 30 is much shorter than when a brushed roller 2 is used as in FIG. 8*b*.

Figure 10A:
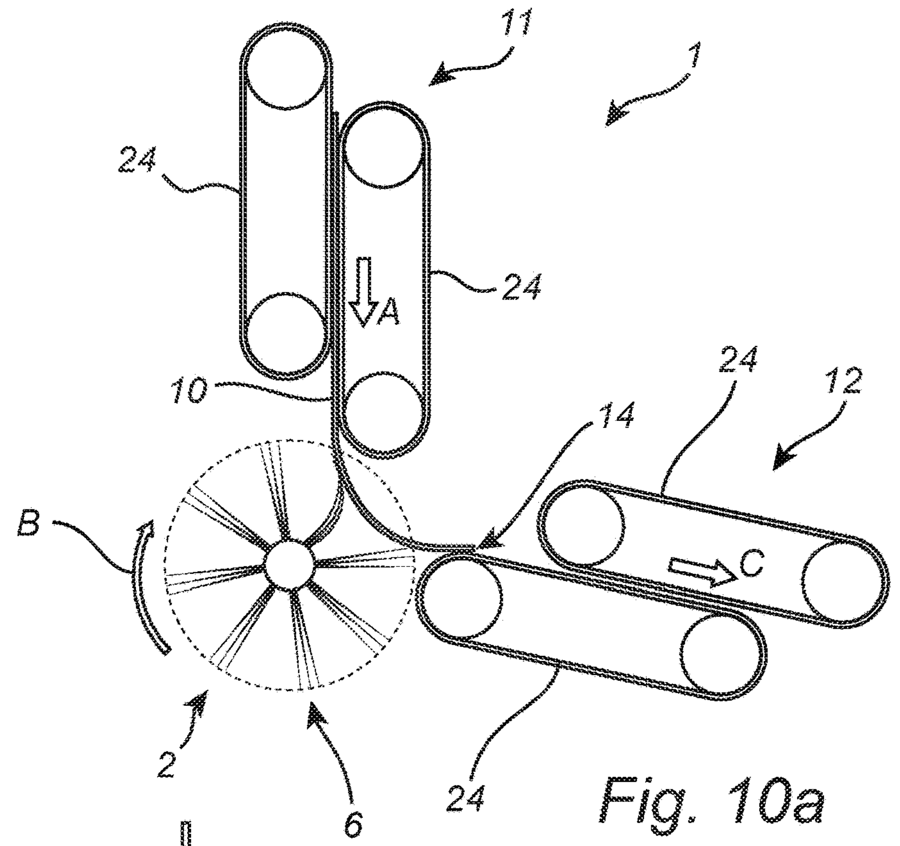
FIG. 10 *a-b* are side views of note directing devices.
Figure 10B:
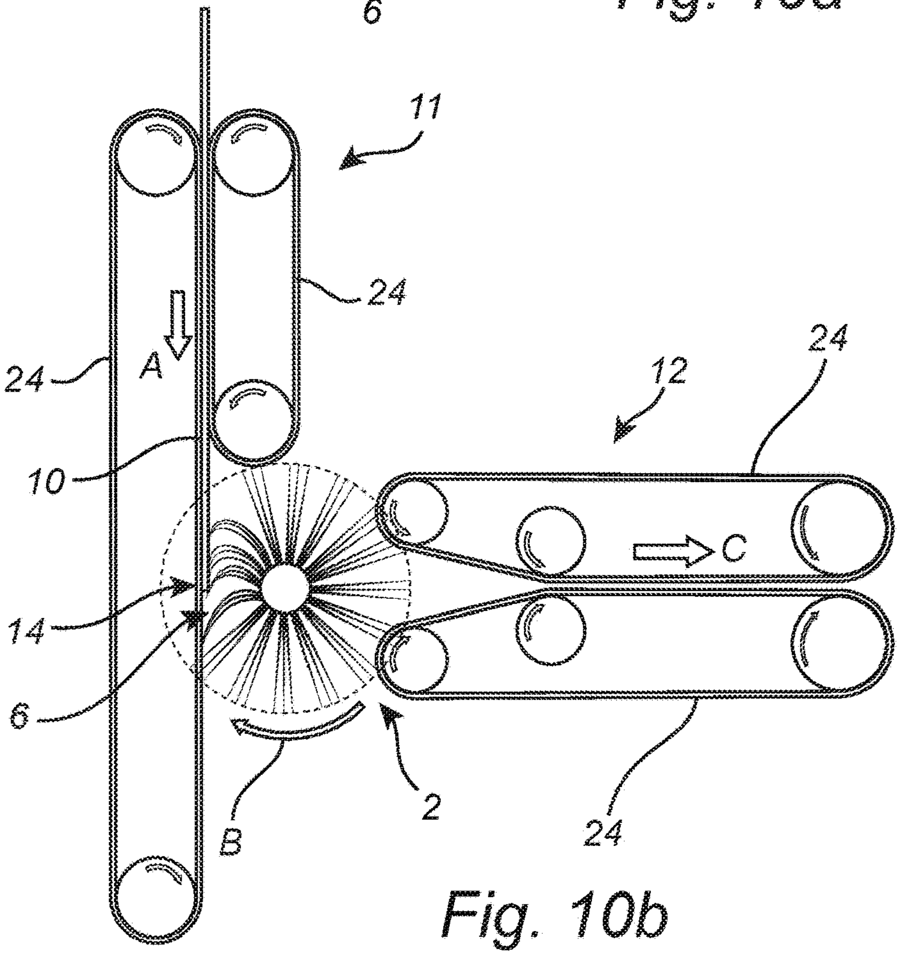

The primary purpose of the note feeders may be to feed the bank note 10 and the primary purpose of the brushed roller 2 may be to direct the leading edge 14 of the bank note 10 during the transition from one note feeder to another. However, a note feeder may also be arranged to take part in directing the leading edge 14. FIG. 10 shows one embodiment, in a side view, wherein the first note feeder 11 and the second note feeder 12 comprise co-acting belts 24. In FIG. 10 the leading edge 14 of the bank note 10 has not yet reached the point where the co-acting belts 24 come together to start feeding the bank note 10. However, by providing support and friction to the bank note 10 one of the belts 24 of the second note feeder 12 may help directing the leading edge 14 towards the point where both belts 24 of the second note feeder 12 get a grip of the bank note 10 and feed it along. Furthermore, a brushed roller 2 may also be arranged to take part in feeding the bank note 10. Due to friction between the bristles 6 and the bank note 10 the brushed roller 2 may provide a force in a direction tangential to the surface of the bank note 10.

The leading edge 14 of the bank note 10 may be presented to the brushed roller 2 after it has left the first note feeder 11, as shown e.g. in FIG. 1. However, the leading edge 14 of the bank note 10 may also be presented to the brushed roller 2 while still in contact with the first note feeder 11, as shown in FIG. 10 *b*. In such a configuration the leading edge 14 may e.g. rest against one of the two co-acting belts 24 of the first note feeder 11. The brushed roller 2 may subsequently peel off the bank note 10 by dragging the bristles 6 over the surface of the belt 24 while the bristles 6 conform to the surface of the belt 24 by bending. Since the bristles 6 in such a configuration may engage a longer segment of the bank note 10 and the belt 24 than a solid rubber wheel 30 would, the redirecting of the bank note 10 may be more fault tolerant. Even if the bank note 10 is not redirected at the first impact with the first bristles of the rotating brushed roller 2 another bristle 6 may follow to make another attempt. Furthermore, if the bristles 6 may bend, the brushed roller 2 may allow the bank note 10 to take a slightly different path from the first note feeder 11 to the second note feeder 12 than a bank note 10 that is redirected at first impact without the bank note 10 being damaged. In contrast, if a solid rubber wheel 30 was used and the leading edge 14 was not redirected at first impact with the rubber wheel 30 it would possibly not be possible to redirect it once the leading edge has passed the contact point of the rubber wheel 30 and the belt 24 without the bank note 10 turning back on itself, thereby risking crumpling or folding.

The note feeders and the brushed roller 2 may be moving constantly or only when a bank note 10 is anticipated. The note feeders may be operated such that the feeding speed of the bank note 10 is the same for the first note feeder 11 and second note feeder 12. The feeding speed may also be slightly different. When the second note feeder 12 has accepted the bank note 10, the first note feeder 11 may go into an idling mode such that the bank note 10 is being pulled by the second note feeder 12. However, in a preferred embodiment both note feeders feed the bank note simultaneously at the same speed. The feeding speed may be considered to be the linear speed at which the note feeder's contact area to the bank note 10 is moving.

The brushed roller 2 may have a rotational speed such that the end of the bristle 6 that is furthest away from the axis 4 is moving with a linear speed that is faster than the speed of the bank note 10 being fed by the first 11 or the second note feeder 12. However, the rotational speed may also be such that the end of the bristle 6 that is furthest away from the axis 4 is moving with a linear speed that is the same or slower than the speed of the bank note 10 being fed by the first 11 or the second note feeder 12.

The speed of the note feeders and brushed roller 2, may be controlled by individual drivelines. However, the note feeders and brushed roller 2 may also be powered by the same driveline wherein the speed of the note feeders and brushed roller 2, relative to each other, may be set using e.g. gears. By using individual drivelines or a single driveline with gears one could e.g. set the rotational speed of the brushed roller 2 such that the end of the bristle 6 that is furthest away from the axis 4 is moving with a linear speed that is faster than the speed of the bank note 10. According to an embodiment, the rotational speed of the brushed roller 2 may be set such that the end of the bristle 6 that is furthest away from the axis 4 is moving with a linear speed that is 1.5 to 2 times faster than the speed of the bank note 10. The rotational speed may also be dependent on the bristle 6 length and the size of the circumferential gaps 20 between the bristles, in addition to the speed of the bank note 10. Thus the rotational speed could be set such that at least one bristle 6 engages the bank note 10 within the time it takes the bank note 10 to travel a distance, the distance being half the length of a bristle 6, after the bank note 10 being presented to the brushed roller 2.

In one embodiment the direction of the note feeders and the brushed roller 2 may be reversed such that the direction of movement of the bank note 10 may be reversed. For example, the feeding direction of the first note feeder 11, the second note feeder 12 and the brushed roller 2 may all be set individually by changing the direction of their individual drivelines or in the case of a common driveline changing gears individually. However, the direction of all the note feeders and the brushed roller 2 may also be simultaneously reversed by e.g. changing the direction of a common driveline or having the common driveline always drive in one direction and controlling how the power is transferred to the note directing device 1 with a reverse gear. FIG. 11 *a-b* show, in side view, an embodiment of a note directing device 1 wherein the direction of the bank note may be reversed.

Figure 11A:
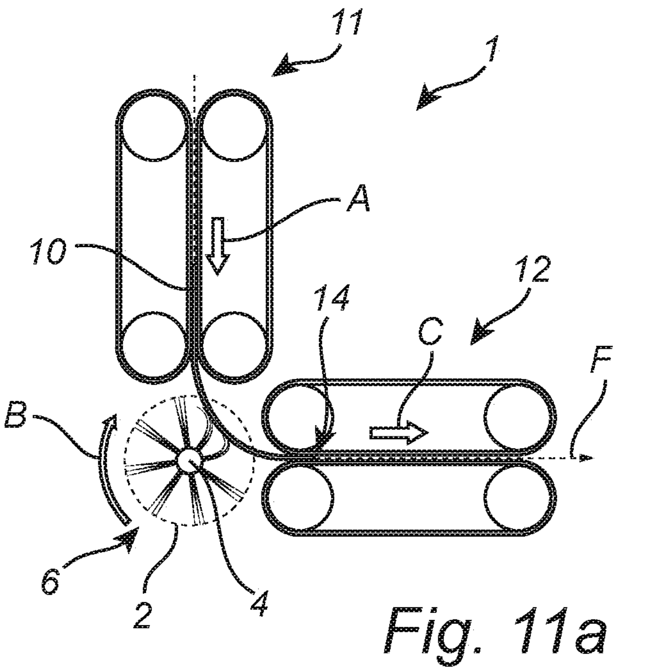
FIG. 11 *a* is a side view of a note directing device in a first operation mode.
FIG. 11*b* is a side view of a note directing device in a second operation mode.

FIG. 11*a* shows a note directing device in a first operation mode, wherein the bank note 10 moves along a first path F from the first note feeder 11 to the second note feeder 12. The first note feeder 11 has a feeding direction A such that the leading edge 14 of a bank note 10 is presented to the brushed roller 2. The brushed roller 2 has a rotational direction B which directs the leading edge 14 of the bank note towards the second note feeder 12. The second note feeder 12 is positioned such that the leading edge 14 approaching from the brushed roller 2 may enter the note feeder. The second note feeder 12 further has a feeding direction C which allows the second note feeder 12 to accept the bank note 10 and feed it away from the brushed roller 2.

Figure 11B:
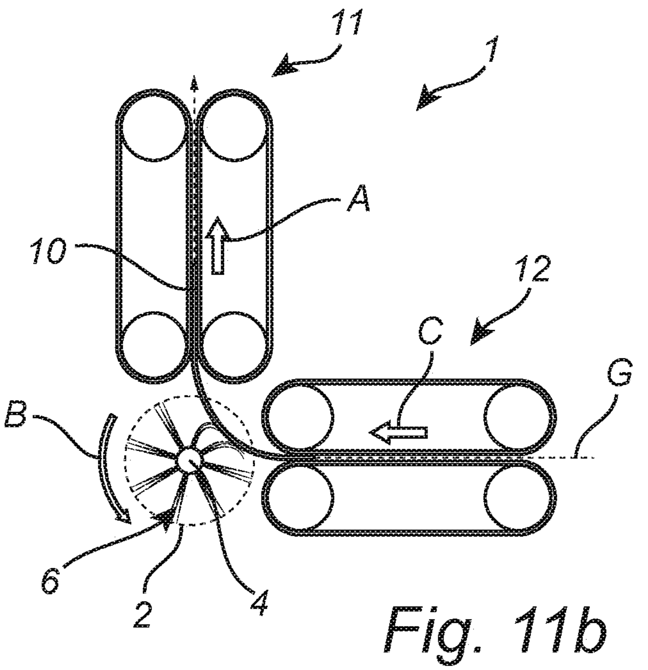

FIG. 11*b* shows a note directing device in a second operation mode, wherein the bank note 10 moves along a second path G from the second note feeder 12 to the first note feeder 11. The feeding directions A and C as well as the rotational direction B are reversed as compared to FIG. 11*a*. The second note feeder 12 has a feeding direction C such that the leading edge 14 of a bank note 10 is presented to the brushed roller 2. The brushed roller 2 has a rotational direction B which directs the leading edge 14 of the bank note towards the first note feeder 11. The first note feeder 11 is positioned such that the leading edge 14 approaching from the brushed roller 2 may enter the note feeder. The first note feeder 11 further has a feeding direction A which allows the second note feeder 12 to accept the bank note 10 and feed it away from the brushed roller 2.

In one embodiment the note directing device 1 may act as a route selector for a bank note 10. FIG. 12 *a-d* show an embodiment wherein a first note feeder 11, a second note feeder 12, a third note feeder 13 and a brushed roller 2 are configured such that at least four different paths may be selected. The note directing device 1 in FIG. 12 *a-d* has note feeders comprising co-acting belts. In this embodiment the first and the third note feeder has a common belt 32. A common belt 32 may improve the accuracy of the note directing device 1 as the common belt 32 may facilitate the directing of the leading edge 14 from one note feeder to the other. However, it should be understood that other embodiments, not comprising a common belt, also are possible.

Figure 12A:
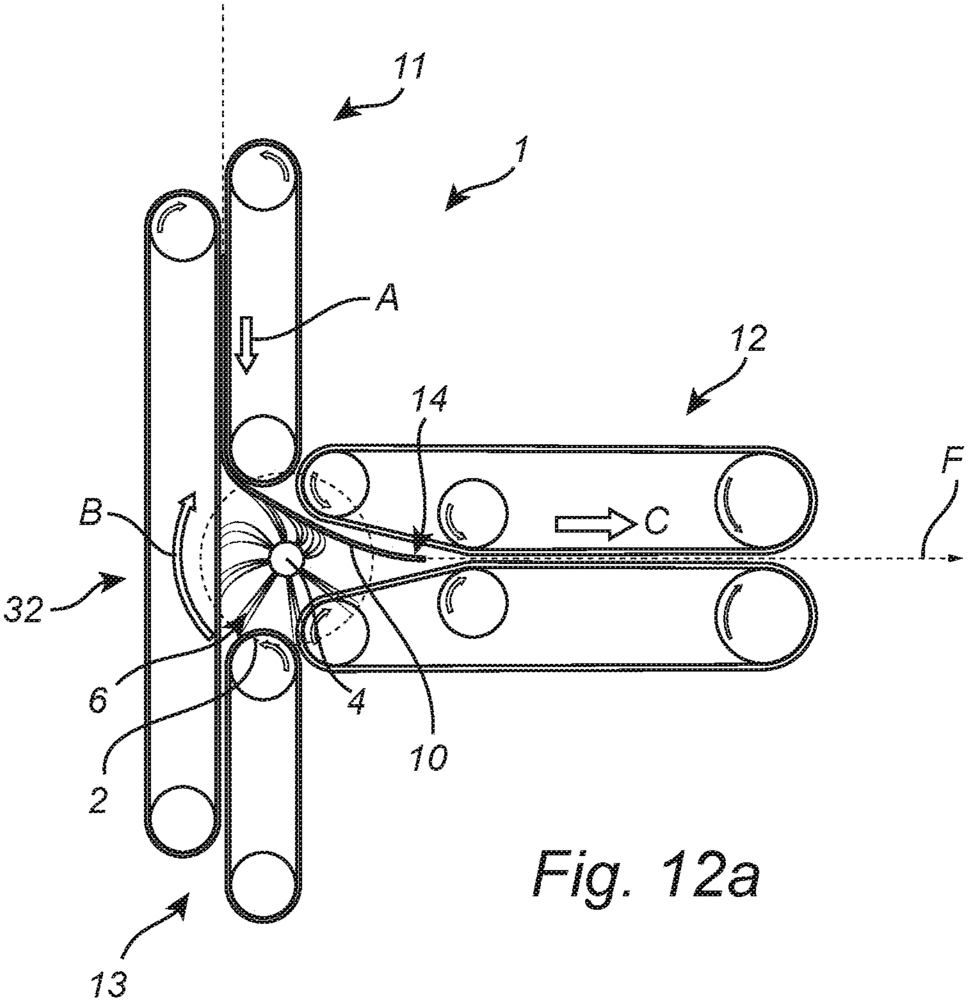
FIG. 12*a* is a side view of a note directing device in a first operation mode.

FIG. 12*a* shows a note directing device in a first operation mode, wherein the bank note 10 moves along a first path F from the first note feeder 11 to the second note feeder 12. The first note feeder 11 has a feeding direction A such that the leading edge 14 of the bank note 10 is presented to the brushed roller 2. The brushed roller 2 has a rotational direction B which directs the leading edge 14 of the bank note towards the second note feeder 12. The second note feeder 12 is positioned such that the leading edge 14 approaching from the brushed roller 2 may enter the note feeder. The second note feeder 12 further has a feeding direction C which allows the second note feeder 12 to accept the bank note 10 and feed it away from the brushed roller 2.

Figure 12B:
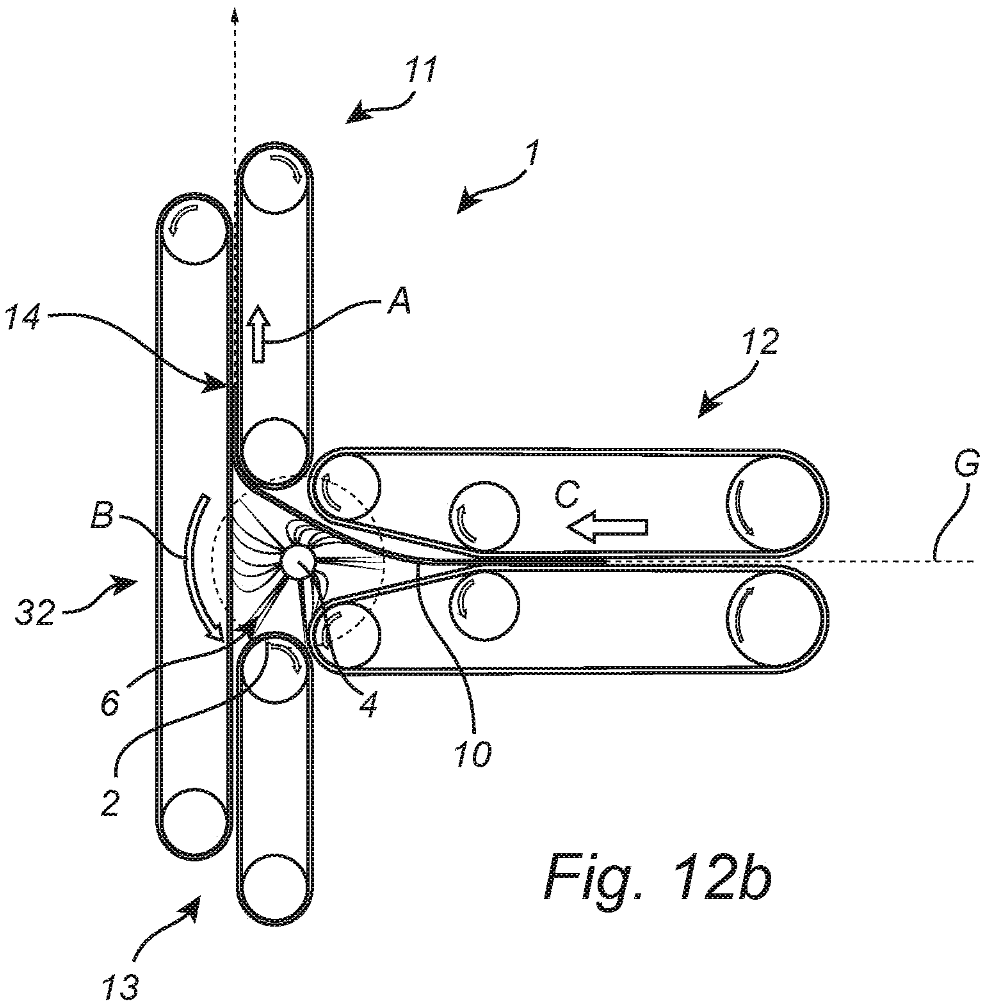
FIG. 12*b* is a side view of a note directing device in a second operation mode.

FIG. 12*b* shows a note directing device in a second operation mode, wherein the bank note 10 moving along a second path G from the second note feeder 12 to the first note feeder 11. The feeding directions A and C as well as the rotational direction B are reversed as compared to FIG. 12*a*. The second note feeder 12 has a feeding direction C such that the leading edge 14 of the bank note 10 is presented to the brushed roller 2. The brushed roller 2 has a rotational direction B which directs the leading edge 14 of the bank note towards the first note feeder 11. The first note feeder 11 is positioned such that the leading edge 14 approaching from the brushed roller 2 may enter the note feeder. The first note feeder 11 further has a feeding direction A which allows the second note feeder 12 to accept the bank note 10 and feed it away from the brushed roller 2.

Figure 12C:
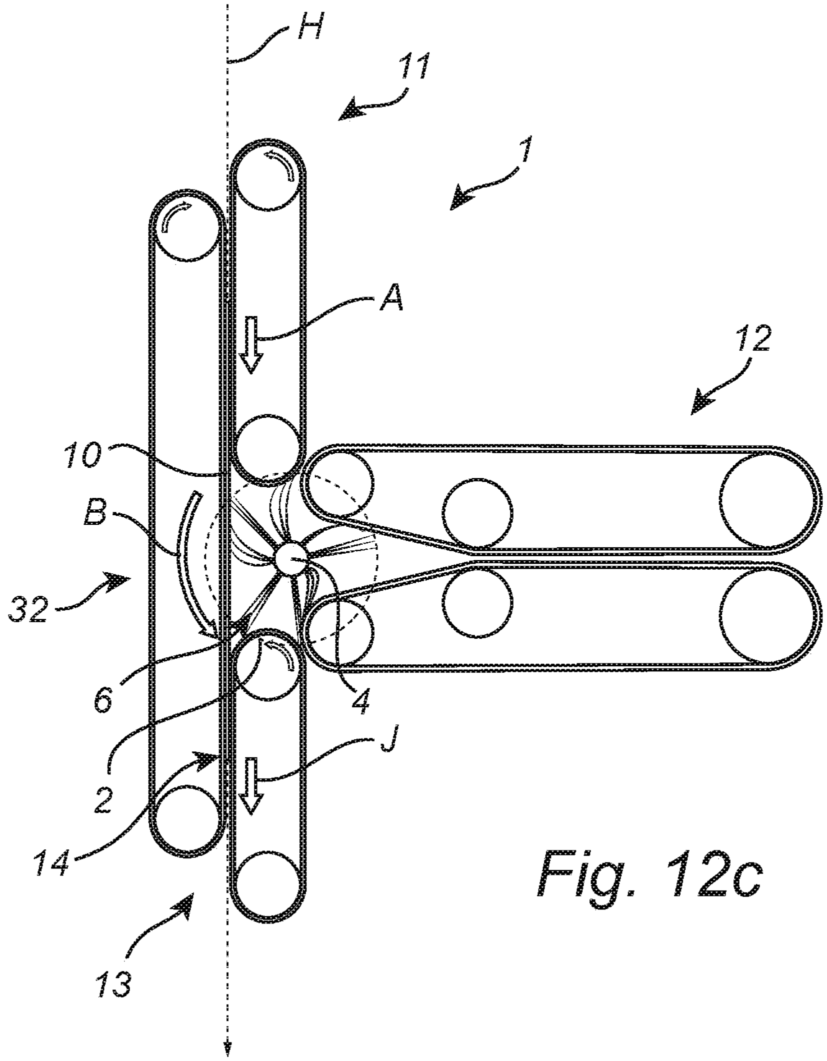
FIG. 12*c* is a side view of a note directing device in a third operation mode.

FIG. 12*c* shows a note directing device in a third operation mode, wherein the bank note 10 moving along a third path H from the first note feeder 11 to the third note feeder 13. The first note feeder 11 has a feeding direction A such that the leading edge 14 of a bank note 10 is presented to the brushed roller 2. The brushed roller 2 has a rotational direction B which directs the leading edge 14 of the bank note towards the third note feeder 13. The third note feeder 13 is positioned such that the leading edge 14 approaching from the brushed roller 2 may enter the note feeder 13. The third note feeder 13 further has a feeding direction which allows the third note feeder 13 to accept the bank note 10 and feed it away from the brushed roller 2.

Figure 12D:
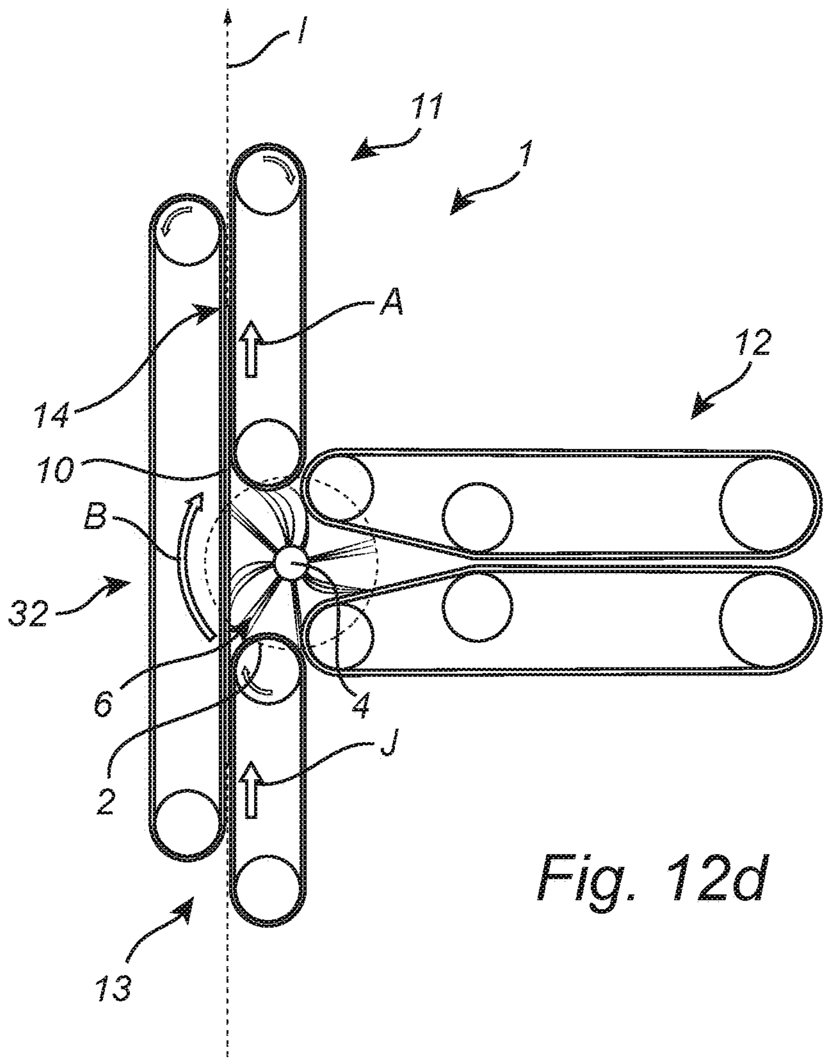
FIG. 12*d* is a side view of a note directing device in a fourth operation mode.

FIG. 12*d* shows a note directing device in a fourth operation mode, wherein the bank note 10 moves along a fourth path I from the third note feeder 13 to the first note feeder 11. The feeding directions A and J as well as the rotational direction B are reversed as compared to FIG. 12*c*. The third note feeder 13 has a feeding direction J such that the leading edge 14 of a bank note 10 is presented to the brushed roller 2. The brushed roller 2 has a rotational direction B which directs the leading edge 14 of the bank note towards the first note feeder 11. The first note feeder 11 is positioned such that the leading edge 14 approaching from the brushed roller 2 may enter the note feeder. The first note feeder 11 further has a feeding direction A which allows the first note feeder 11 to accept the bank note 10 and feed it away from the brushed roller 2.

Figure 13:
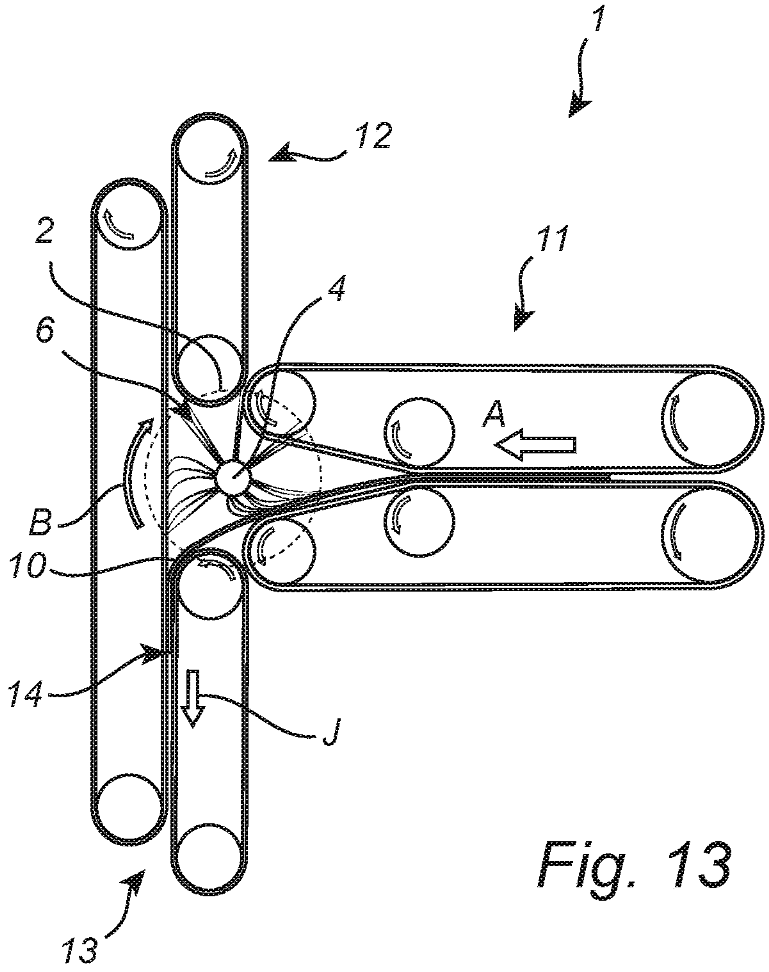
FIG. 13 is a side view of a note directing device.

It should be understood that the first note feeder 11, the second note feeder 12, and the third note feeder 13 may have various orientations relative to each other. In FIG. 12 *a-d* the note feeders are oriented such that a bank note 10 may move from the first note feeder 11 to the second note feeder by making a 90° left turn and move from the first note feeder 11 to the third note feeder by travelling straight. However, a configuration as shown in FIG. 13 is also possible. In FIG. 13 the note feeders are oriented such that a bank note 10 may move from the first note feeder 11 to the second note feeder by making a 90° right turn and move from the first note feeder 11 to the third note feeder by making a 90° left turn.

Figure 14:
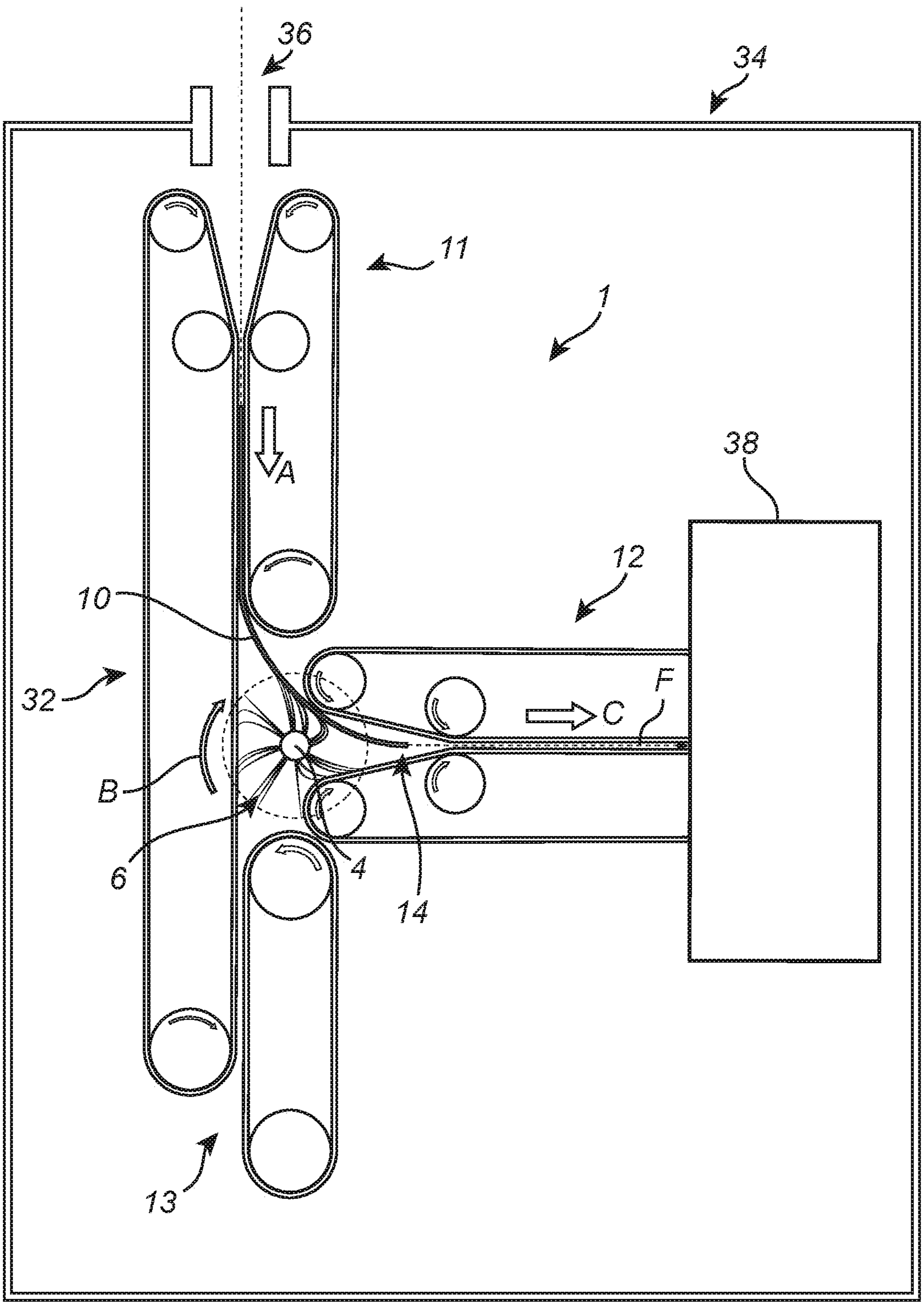
FIG. 14 is a side view of a cash recycling apparatus.

In one embodiment of the invention a note directing device 1 is a part of a cash recycling apparatus 34, as seen in FIG. 14. In such an apparatus a note access opening 36 may be provided in the form of e.g. a slit in the casing of the cash recycling apparatus 34. A bank note 10 which is inserted into the note access opening 36 may e.g. be transported along a first path F to a note storage unit 38. The bank note inserted into the note access opening 36 may e.g. enter in between two co-acting belts of a first note feeder 11. In a first operation mode the first note feeder 11 may transport the bank note 10 to a brushed roller 2 which directs the bank note 10 to a second note feeder 12. The second note feeder 12 may then transport the bank note 10 to a note storage unit 38 wherein the bank note may be stored. Thus the first operation mode may perform a bank note 10 deposit into the note storage unit 38. Analogously, the bank note 10 may, in a second operation mode, be transported from the note storage unit 38 to the note access opening 36 by e.g. reversing the feeding direction A of the first note feeder, the rotational direction B of the brushed roller and the feeding direction C of the second note feeder, as compared to the first operation mode, so that the bank note 10 travels along a second path G. Thus the second operation mode may perform a bank note 10 withdrawal from the note storage unit 38.

It should be understood that the paths which the bank note 10 travels in the first and the second operation mode do not necessarily need to be opposite to each other. For example, the bank note 10 may travel along one path from the note access opening 36 via the first 11 and second note feeder 12 to the note storage unit 38 for a deposit but then travel along another path from the note storage unit 38 via the second note feeder 12 and a third note feeder 13 to the note access opening 36. The brushed roller 2 may be used to select which path the bank note takes. It should also be understood that a cash recycling apparatus 34 comprising a note directing device 1 with a first 11, a second 12 and a third note feeder 13 may further comprise additional note storage units 38. For example, if the first note feeder 11 is connected to the note access opening 36 the second 12 and third note feeder 13 may be connected to different note storage units 38. Furthermore, the third note feeder may also be connected to a fourth and a fifth note feeder via a brushed roller 2. Thus, even further note storage units may be connected. These may e.g. be used for notes of different denominations or different origins. Some of the note feeders may also be connected to detection routes where various features of the bank notes 10, e.g. denomination, origin etc., may be determined.

A note directing device 1 may also or alternatively be used for selecting whether a bank note 10 is to be transported towards a storage of bank notes 10 in the apparatus 34 or transported to be output from the apparatus 34 if the bank note is rejected.

Figure 15:
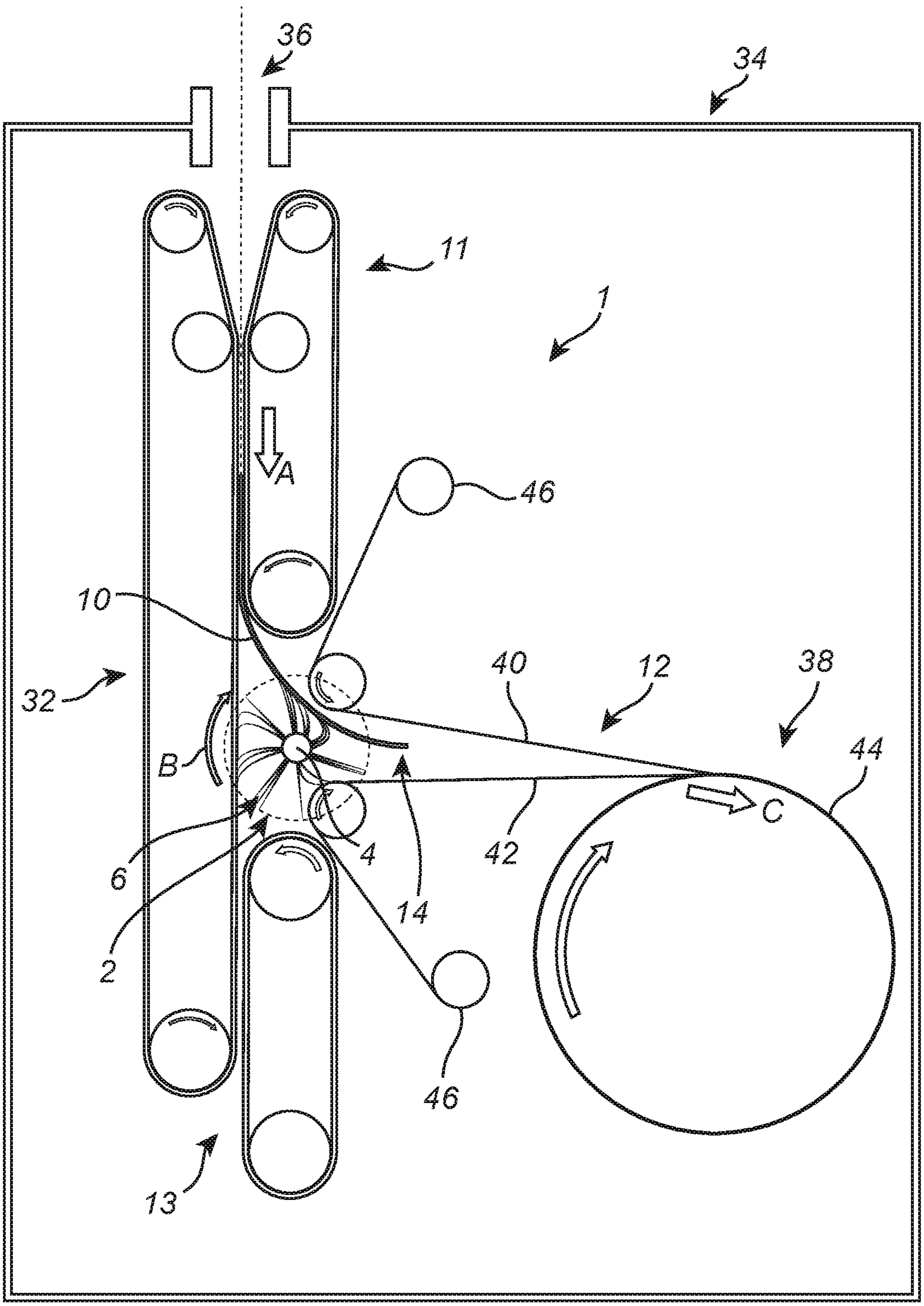
FIG. 15 is a side view of a cash recycling apparatus.

The note storage unit 38 may be implemented in many ways. One way is illustrated in FIG. 15. A first film 40 and a second film 42 are wound around a note storage drum 44. Bank notes 10 may be fed in between the first 40 and the second 42 film and thus spooled onto the note storage drum 44. Thus the first 40 and a second 42 film acts both as a note feeder and as a part of the note storage drum 44. The first 40 and the second 42 films may be fed onto the note storage drum 44 from film storage drums 46. A further description of note storage drums 44 may be found in EP1466303.

Figure 16:
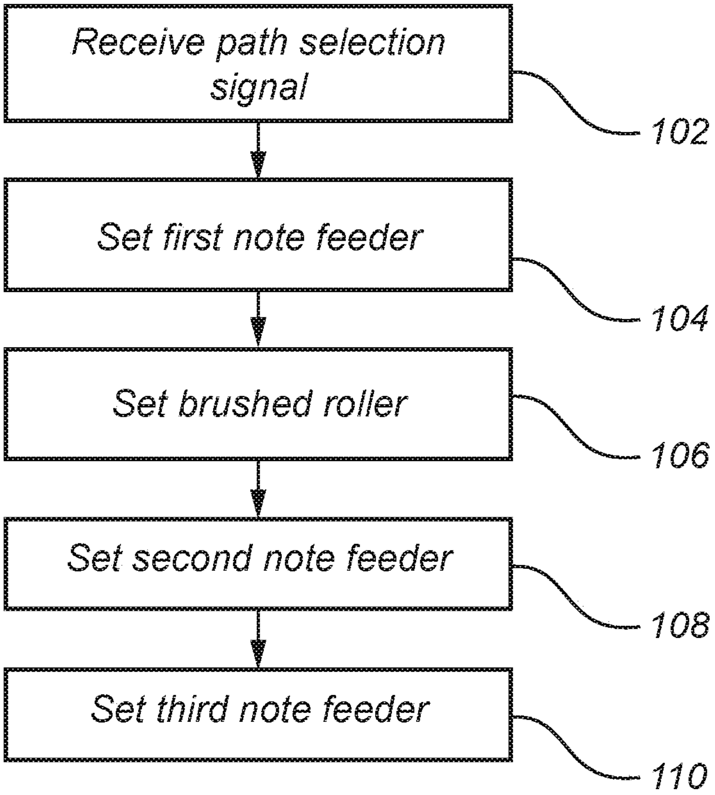
FIG. 16 is a flow chart of a method according to an embodiment.

FIG. 16 illustrates a method for directing a bank note 10 in a note directing device 1, wherein the bank note 10 can be directed along a path by controlling a first note feeder 11, a brushed roller 2, and a second note feeder 12, wherein the brushed roller 2 comprises an axis 4 and bristles 6, each bristle 6 being attached at one end to the axis 4 and extending radially from said axis 4, the distribution of bristles 6 extending along a longitudinal direction E of the axis. The method comprises receiving a path selection signal 102 and in response: set the first note feeder 104, set the brushed roller 106, and set the second note feeder 108. If the note directing device 1 further comprises a third note feeder 13, the method may further comprise the step of setting the third note feeder 110.

The path selection signal may be e.g. a transistor-transistor logic (TTL) signal, a RS-232 serial signal, or a USB signal. The signal may emanate from a processor unit e.g. as a response to a user request to e.g. withdraw cash. It may also emanate from a bank note validation unit. The bank note validation unit may e.g. detect that a bank note 10 has a certain denomination, wherein the denomination requires a certain path. The bank note validation unit may also or alternatively detect whether a bank note 10 is to be accepted or rejected by the apparatus 34, wherein an accepted bank note 10 may be transported for storage of the bank note 10 and a rejected bank note 10 may be transported to be output from the apparatus 34. The path selection signal may also be a combination of several signals.

If the path selection signal indicates a desired bank note 10 movement along a first path F from the first note feeder 11 via the brushed roller 2 to the second note feeder 12 then the first note feeder 11 may be set 104 such that the first note feeder 11 presents the leading edge 14 to the brushed roller 2. This may be done by setting the feeding direction A such that the bank note 10 moves towards the brushed roller 2 and setting a suitable feeding speed such that the brushed roller 2 may direct the leading edge 14. The feeding speed may be generic and preselected, e.g. a single feeding speed suitable for bank notes 10 of different origin and condition may be used always. However, the feeding speed may also be specific to the bank note 10 approaching the brushed roller 2, e.g. a detector signal may indicate that the approaching bank note 10 is of a specific type, requiring a specific feeding speed.

In further response to the first path selection signal the brushed roller 2 may be set 106 to have a rotational direction B and a rotational speed such that it engages the bank note

10 presented by the first note feeder 11 and directs the leading edge 14 of the bank note 10 towards the second note feeder 12. A suitable rotational direction B may be a direction wherein the interaction between the bank note 10 and the brushed roller 2 together with the interaction between the bank note 10 and gravity forces the leading edge 14 to move from the first note feeder 11 to the second note feeder 12. A suitable rotational direction B may also be the rotational direction B which directs the leading edge along a short path, rather than a long path, from the first note feeder 11 to the second note feeder 12. A suitable rotational speed B may be a speed adapted to the inertia of the bank note 10, allowing the bank note 10 to change direction in a controllable manner. A suitable rotational speed B may also be a speed which ensures that the leading edge 14 starts to be redirected before it passes the axis 4 of the brushed roller 2.

The rotational speed may be generic and preselected, e.g. a single rotational speed suitable for bank notes 10 of different origin and condition may be used always. However, the rotational speed may also be specific to the bank note 10 approaching the brushed roller 2, e.g. a detector signal may indicate that the approaching bank note 10 is of a specific type, requiring a specific rotational speed.

In further response to the first path selection signal the second note feeder 12 may be set 108 such that it accepts the leading edge 14 of the bank note 10 from the brushed roller 2. This may be done by setting the feeding direction C such that the accepted leading edge 14 of the bank note 10 moves away from the brushed roller 2 and setting a suitable feeding speed. A suitable feeding speed for the second note feeder 12 may e.g. be a speed which do not put unnecessary strain on the bank note 10 if it is still being fed by the first note feeder 11. The feeding speed may be generic and preselected, e.g. a single feeding speed suitable for bank notes 10 of different origin and condition may be used always. However, the feeding speed may also be specific to the bank note 10 approaching the brushed roller 2, e.g. a detector signal may indicate that the approaching bank note 10 is of a specific type, requiring a specific feeding speed.

In one embodiment the method additionally allows the bank note 10 to be directed along a second path G by controlling the first note feeder 11, the brushed roller 2, and the second note feeder 12. When a second path selection signal is received 102, the second path selection signal indicating a desired bank note 10 movement along the second path G from the second note feeder 12 via the brushed roller 2 to the first note feeder 11, the first note feeder 11 may be set 104, the brushed roller 2 may be set 106, and the second note feeder 12 may be set 108. Setting the first 104 and second 108 note feeder and the brushed roller 106 may be done in analogy to their setting in response to the first path selection signal but with the bank note 10 moving along a second path G which has the opposite direction of the first path F. The feeding direction of the first 11 and second 12 note feeder in response to the second path selection signal may be opposite to the feeding direction of the first 11 and second 12 note feeder in response to the first path selection signal. The rotational direction of the brushed roller 2 in response to the second path selection signal may be opposite to the rotational direction of the brushed roller 2 in response to the first path selection signal.

In one embodiment the method additionally allows the bank note 10 to be directed along a third H and a fourth I path by setting 110 a third note feeder 13 in addition to setting 104 the first note feeder 11, setting 106 the brushed roller 2, and setting 108 the second note feeder 12. A third path selection signal may indicate a desired bank note 10 movement along the third path H from the first note feeder 11 via the brushed roller 2 to the third note feeder 13. A fourth path selection signal may indicate a desired bank note 10 movement along the fourth path I from the third note feeder 13 via the brushed roller 2 to the first note feeder 11. The setting of the first 11 and third 13 note feeders and the brushed roller 2 in response to the third or fourth path selection signal may be conducted analogously to the setting of the first 11 and second 12 note feeders and the brushed roller 2 in response to the first or second path selection signal.

It should be understood that whenever a path selection signal is received the note feeders and the brushed roller involved in the path may be set either simultaneously or sequentially. The timing of setting the note feeders and the brushed roller may be such that the movement direction and speed of each component has reached its set value before the leading edge 14 of the bank note 10 reaches the component in question. The timing of setting the note feeders and the brushed roller 2 may also be such that whenever two note feeders are feeding the bank note 10 the note feeders have the same feeding speed.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A note directing device for controlling a path of a bank note, comprising a first note feeder, a second note feeder, and a single brushed roller in the path of the bank note between the first note feeder and the second note feeder; wherein the note directing device in a first operation mode is configured to control a movement of the bank note along a first path from the first note feeder via the brushed roller to the second note feeder such that:

the first note feeder is configured to feed the bank note along a direction tangential to a surface of the bank note such that a leading edge of the bank note is presented to the brushed roller;

the brushed roller is configured to engage with the bank note and rotate in a direction such that the leading edge of the bank note is directed towards the second note feeder;

the second note feeder is configured to accept the leading edge of the bank note and to feed the bank note along a direction tangential to a surface of the bank note;

wherein the brushed roller comprises an axis and bristles, each bristle being attached at one end to the axis and extending radially from said axis, the distribution of bristles extending along a longitudinal direction of the axis;

wherein at least one note feeder comprises two co-acting belts and at least a first of the two co-acting belts is in contact with at least two pulleys, wherein the note feeder is configured to feed the bank note along a direction tangential to a surface of the bank note by sandwiching the bank note between the two co-acting belts such that the first of the two co-acting belts contacts a first surface of the bank note and a second of the two co-acting belts contacts a second surface, opposite the first surface, of the bank note, and moving the two-co-acting belts in the direction tangential to a surface of the bank note such that the first surface of the bank note contacts the first of the two co-acting belts at a location of a first of the at least two pulleys and subsequently at a location of a second of the at least two pulleys.

2. The note directing device of claim 1, wherein the bristles of the brushed roller are configured such that the bristles make contact with at least one of the first and second note feeder when the brushed roller is rotated.

3. The note directing device of claim 2, wherein the bristles in contact with the at least one note feeder are configured to conform to the surface of the at least one note feeder by bending.

4. The note directing device of claim 1, wherein the bristles are arranged to extend in a plurality of different angular directions distributed over an entire circumference of the axis of the brushed roller.

5. The note directing device of claim 1, wherein a plurality of sets of bristles is arranged to be distributed along the longitudinal direction of the axis, wherein the bristles of each set of bristles are arranged to extend in a plurality of different angular directions distributed over an entire circumference of the axis of the brushed roller.

6. The note directing device of claim 1, wherein the brushed roller has a rotational speed such that the end of the bristle that is furthest away from the axis is moving with a linear speed that is faster than a speed of the bank note being fed by the first or the second note feeder.

7. The note directing device of claim 1, wherein the brushed roller has a rotational speed such that the end of the bristle that is furthest away from the axis is moving with a linear speed that is faster than a speed of the leading edge of the bank note.

8. The note directing device of claim 1, wherein the bristles are made of electrically conductive material.

9. The note directing device of claim 1, wherein the note directing device in a second operation mode is configured to control a movement of the bank note along a second path from the second note feeder via the brushed roller to the first note feeder such that:

the second note feeder is configured to feed the bank note along a direction tangential to a surface of the bank note such that a leading edge of the bank note is presented to the brushed roller;

the brushed roller is configured to engage with the bank note and rotate in a direction such that the leading edge of the bank note is directed towards the first note feeder;

the first note feeder is configured to accept the leading edge of the bank note and to feed the bank note along a direction tangential to a surface of the bank note.

10. The note directing device of claim 9, further comprising a third note feeder;

wherein the note directing device in a third operation mode is configured to control a movement of the bank note along a third path from the first note feeder via the brushed roller to the third note feeder such that:

the first note feeder is configured to feed the bank note along a direction tangential to a surface of the bank note such that a leading edge of the bank note is presented to the brushed roller;

the brushed roller is configured to engage with the bank note and rotate in a direction such that the leading edge of the bank note is directed towards the third note feeder;

the third note feeder is configured to accept the leading edge of the bank note and to feed the bank note along a direction tangential to a surface of the bank note.

11. The note directing device of claim 10, wherein the note directing device in a fourth operation mode is configured to control a movement of the bank note along a fourth path from the third note feeder via the brushed roller to the first note feeder such that:

the third note feeder is configured to feed the bank note along a direction tangential to a surface of the bank note such that a leading edge of the bank note is presented to the brushed roller;

the brushed roller is configured to engage with the bank note and rotate in a direction such that the leading edge of the bank note is directed towards the first note feeder;

the first note feeder is configured to accept the leading edge of the bank note and to feed the bank note along a direction tangential to a surface of the bank note.

12. A cash recycling apparatus, said cash recycling apparatus comprising:

a note directing device of claim 9, a note access opening connected to the first note feeder and a note storage unit connected to the second note feeder, the note access opening being configured to provide human access to a bank note and the note storage unit being configured to store notes;

wherein the first operation mode directs the bank note from the note access opening to the note storage unit, thereby performing a bank note deposit; and the second operation mode directs the bank note from the note storage unit to the note access opening, thereby performing a bank note withdrawal.

13. A method for directing a bank note, wherein the bank note can be directed along a first path by controlling a first note feeder, a second note feeder, and a single brushed roller in the path of the bank note between the first note feeder and the second note feeder, wherein the brushed roller comprises an axis and bristles, each bristle being attached at one end to the axis and extending radially from said axis, the distribution of bristles extending along a longitudinal direction of the axis; said method comprising:

receiving a first path selection signal, indicating a desired bank note movement along the first path from the first note feeder via the brushed roller to the second note feeder;

in response to receiving the first path selection signal, setting a feeding direction and a feeding speed of the first note feeder such that it presents the leading edge of the bank note to the brushed roller, the feeding direction of the first note feeder being a direction tangential to a surface of the bank note;

in response to receiving the first path selection signal, setting the rotational direction and rotational speed of the brushed roller such that it engages the bank note presented by the first note feeder and directs the leading edge of the bank note towards the second note feeder;

in response to receiving the first path selection signal, setting a feeding direction and a feeding speed of the second note feeder such that it accepts the leading edge of the bank note from the brushed roller, the feeding direction of the second note feeder being a direction tangential to a surface of the bank note;

wherein at least one note feeder comprises two co-acting belts and at least a first of the two co-acting belts is in contact with at least two pulleys, wherein the note feeder is configured to feed the bank note along a direction tangential to a surface of the bank note by sandwiching the bank note between the two co-acting belts such that the first of the two co-acting belts contacts a first surface of the bank note and a second of the two co-acting belts contacts a second surface, opposite the first surface, of the bank note, and moving the two-co-acting belts in the direction tangential to a surface of the bank note such that the first surface of the bank note contacts the first of the two co-acting belts at a location of a first of the at least two pulleys and subsequently at a location of a second of the at least two pulleys.

14. The method according to claim 13, wherein the bank note additionally can be directed along a second path by controlling the first note feeder, the brushed roller, and the second note feeder; said method comprising:

receiving a second path selection signal, indicating a desired bank note movement along the second path from the second note feeder via the brushed roller to the first note feeder;

in response to receiving the second path selection signal, setting the feeding direction and the feeding speed of the second note feeder such that it presents the leading edge of the bank note to the brushed roller, the feeding direction of the second note feeder being a direction tangential to a surface of the bank note;

in response to receiving the second path selection signal, setting the rotational direction and rotational speed of the brushed roller such that it engages the bank note presented by the second note feeder and directs the leading edge of the bank note towards the first note feeder;

in response to receiving the second path selection signal, setting the feeding direction and feeding speed of the first note feeder such that it accepts the leading edge of the bank note from the brushed roller, the feeding direction of the first note feeder being a direction tangential to a surface of the bank note.

* * * * *